United States Patent
Norris et al.

[19]

[11] Patent Number: 6,131,559
[45] Date of Patent: Oct. 17, 2000

[54] CONVECTION OVEN WITH SMOKE MANAGEMENT MEANS

[75] Inventors: John R. Norris, Plano; Michael J. Dobie, Double Oak; Linda J. Talley, Denton; Jarald E. High; Carl J. Dougherty, both of Grand Prairie; Neal S. Cooper, North Richland Hills, all of Tex.

[73] Assignee: Patentsmith Technology, Ltd., Dallas, Tex.

[21] Appl. No.: 09/316,719

[22] Filed: May 21, 1999

Related U.S. Application Data

[60] Provisional application No. 60/086,629, May 23, 1998.

[51] Int. Cl.[7] .............................. A21B 1/00; F24C 15/20
[52] U.S. Cl. .................................. 126/21 A; 126/299 R; 55/440
[58] Field of Search .......................... 126/21 A, 299 R; 55/440, 444, DIG. 36, DIG. 37, 521; 426/523

[56] References Cited

U.S. PATENT DOCUMENTS

| | | | |
|---|---|---|---|
| 3,780,721 | 12/1973 | Druth | 126/21 A |
| 4,108,139 | 8/1978 | Gilliom et al. | 126/21 A |
| 4,319,898 | 3/1982 | Maierhofer | 55/444 |
| 4,516,012 | 5/1985 | Smith et al. | 126/21 A |
| 4,831,238 | 5/1989 | Smith et al. | 126/21 A |
| 4,928,663 | 5/1990 | Nevin et al. | 126/21 A |
| 5,131,841 | 7/1992 | Smith et al. | 126/21 A |
| 5,419,239 | 5/1995 | Covington et al. | 126/21 A |
| 5,499,577 | 3/1996 | Tommasini | 126/21 A |
| 5,598,769 | 2/1997 | Luebke et al. | 99/395 |
| 5,655,511 | 8/1997 | Prabhu et al. | 126/21 A |
| 5,746,118 | 5/1998 | Brunner et al. | 126/41 R |
| 5,810,898 | 9/1998 | Miller | 55/521 |
| 5,918,589 | 7/1999 | Valle et al. | 126/21 A |
| 5,927,265 | 7/1999 | McKee et al. | 126/21 A |

FOREIGN PATENT DOCUMENTS

| | | | |
|---|---|---|---|
| 202331 | 11/1984 | Japan | 126/21 A |

*Primary Examiner*—Ira S. Lazarus
*Assistant Examiner*—David Lee
*Attorney, Agent, or Firm*—Sidley & Austin

[57] ABSTRACT

A convection heating apparatus with smoke and grease management means and an improved temperature controlled gas delivery system. The apparatus includes an exterior cabinet, an interior chamber and intermediate walls disposed between the exterior cabinet and interior chamber such that an intermediate cavity is provided between the interior chamber and intermediate walls and an outer cavity is provided between the exterior cabinet and intermediate walls. The apparatus further includes a product support, preferably a conveyor, disposed in the interior chamber. A blower for circulating temperature controlled gas into said interior chamber is also provided which is in fluid communication with at least one duct (preferably a plurality) having a jet plate with orifices positioned to direct temperature controlled gas toward the product support. A second blower is provided for circulating air through the outer cavity and intermediate cavity to cool the exterior cabinet walls and interior chamber walls. An improved air delivery duct is provided having a dual taper resulting in uniform distribution of the temperature controlled gas to a food product. An air filtering system is also provided comprising a perforated filter plate or louvers and/or catalytic converter disposed in the temperature controlled gas return path.

36 Claims, 33 Drawing Sheets

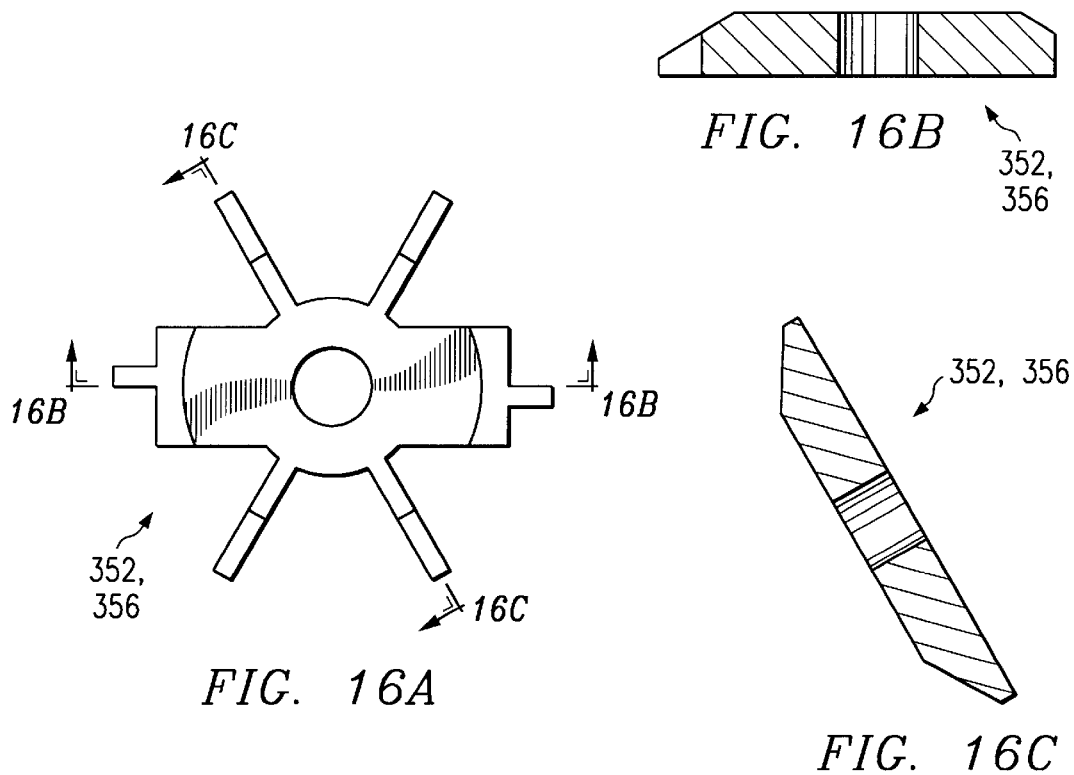
FIG. 16B
FIG. 16A
FIG. 16C
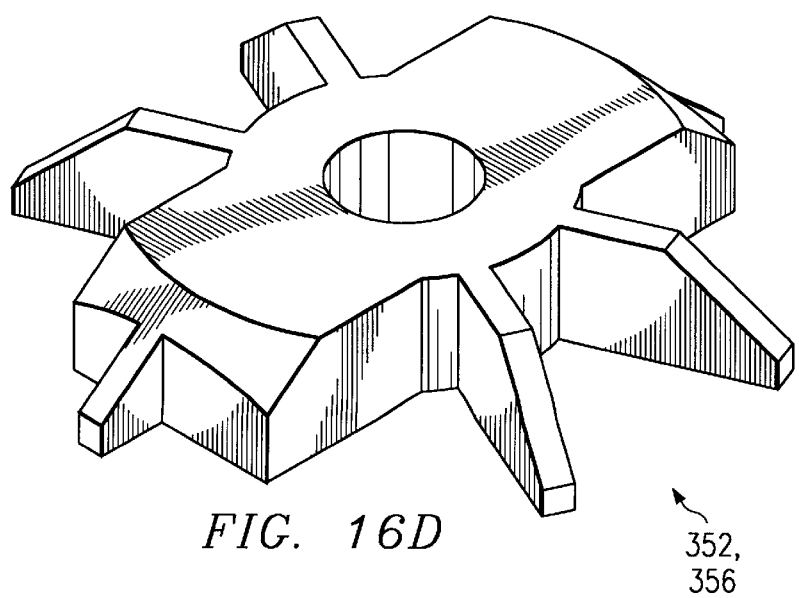
FIG. 16D

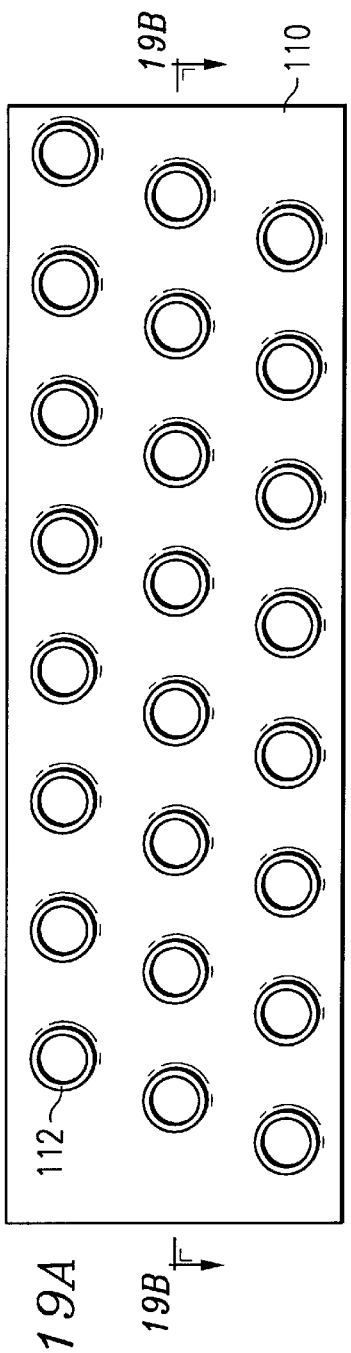
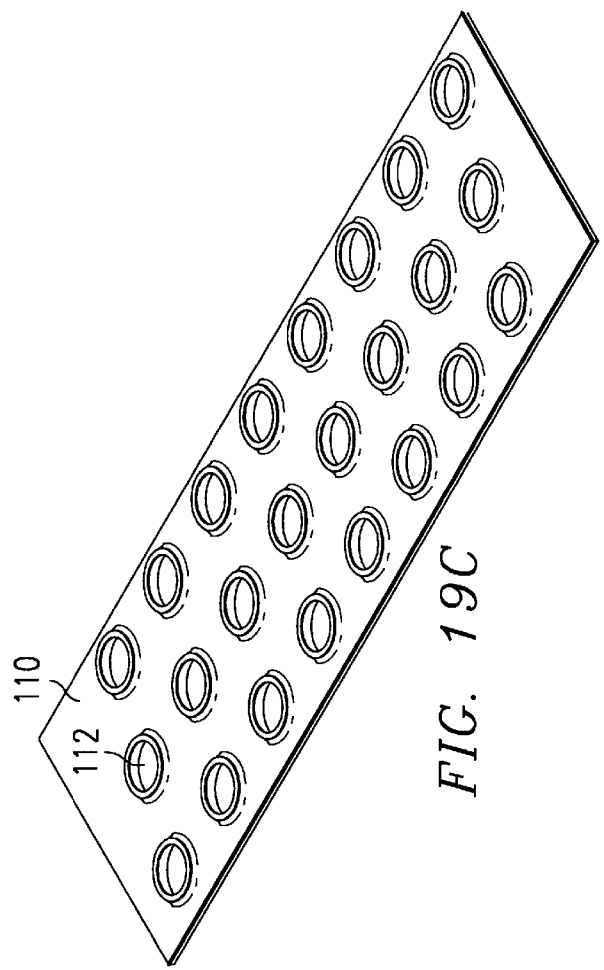
FIG. 19A
FIG. 19B
FIG. 19C

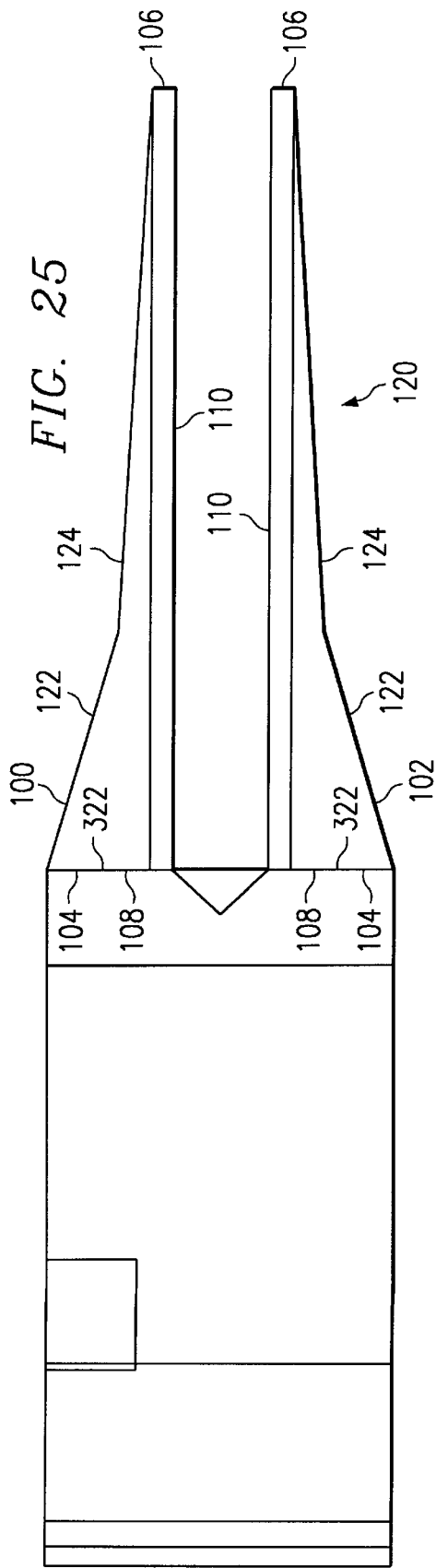

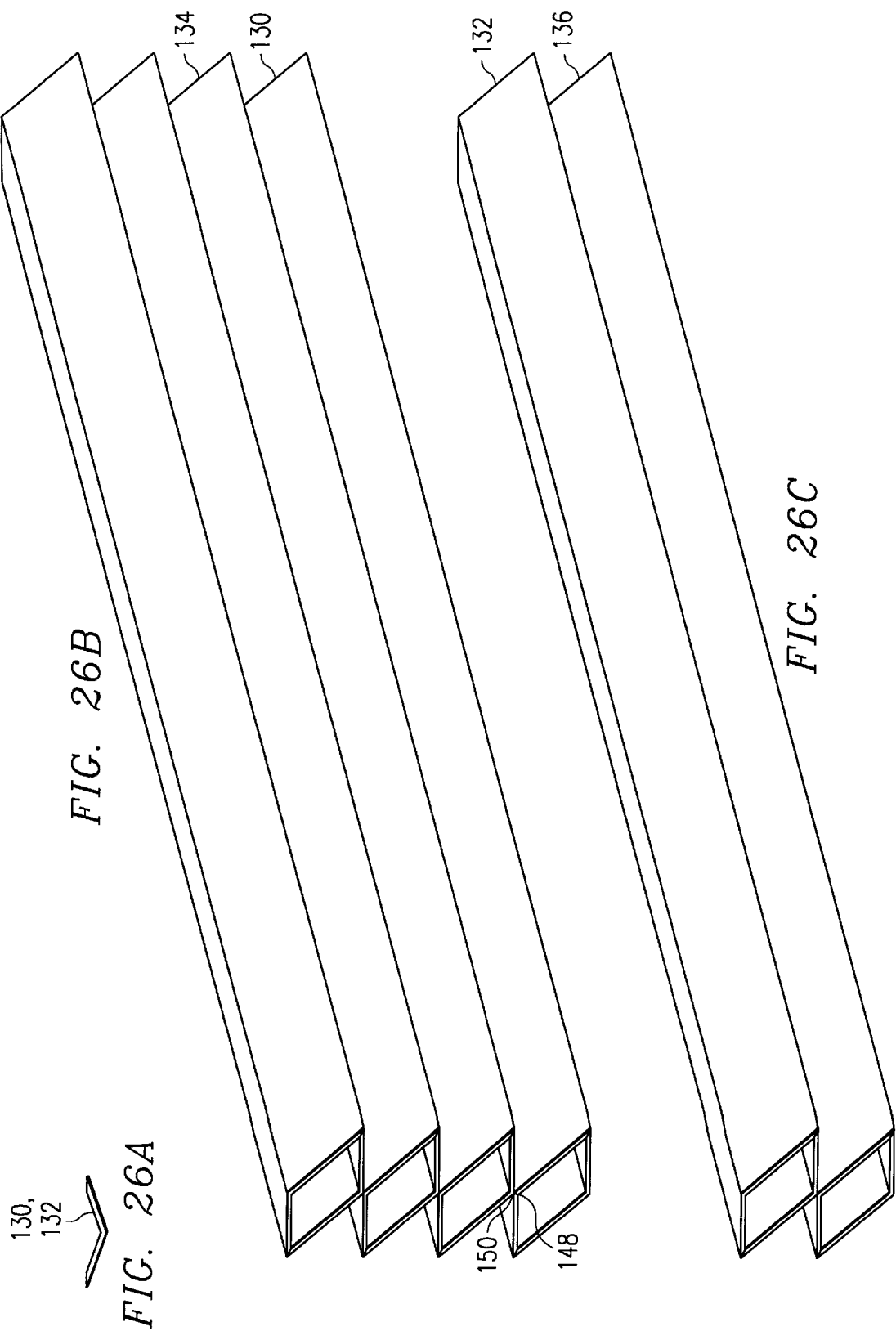

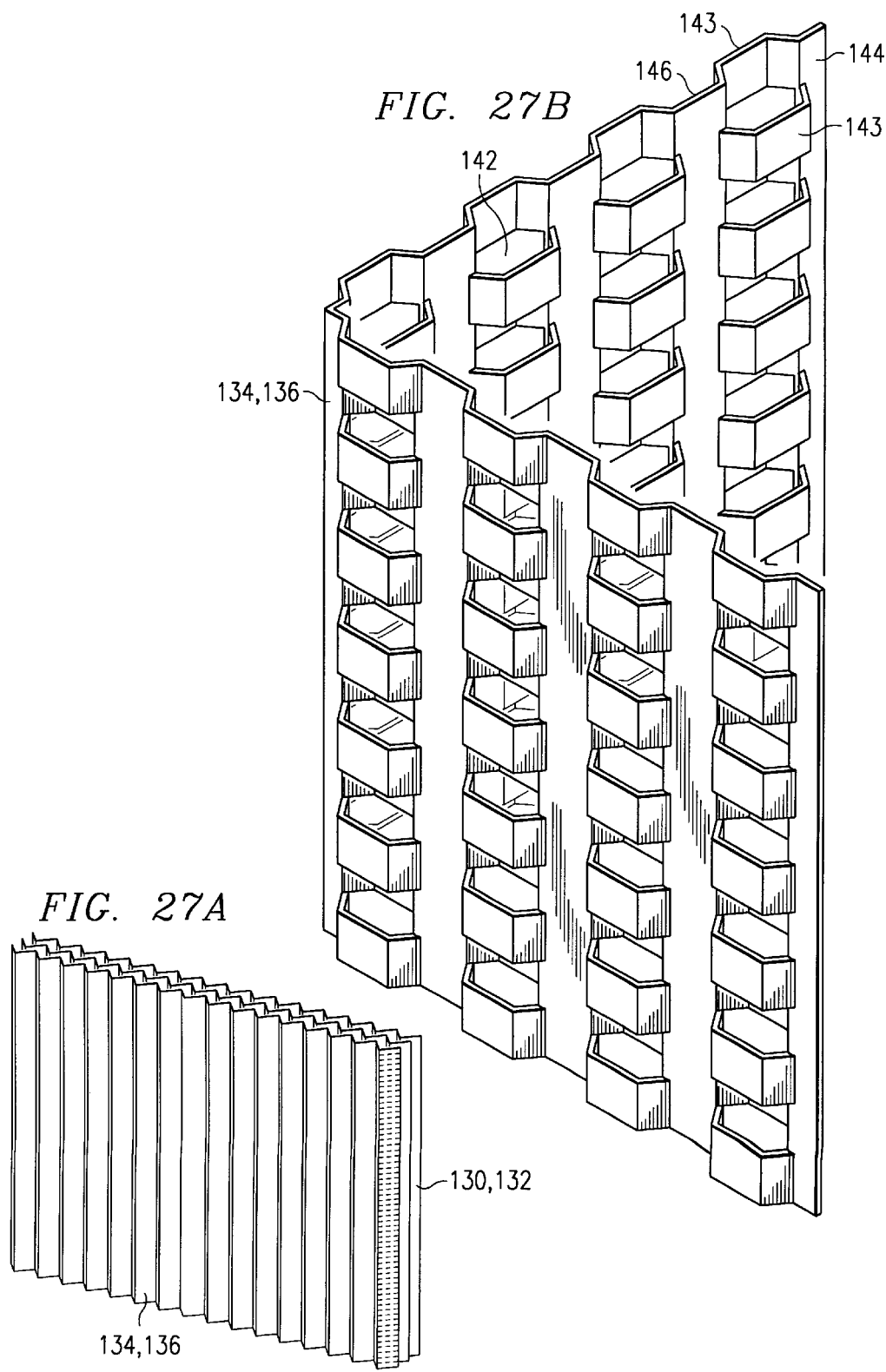

CONVECTION OVEN WITH SMOKE MANAGEMENT MEANS

CROSS REFERENCE TO RELATED APPLICATION

This application claims the benefit of prior filed provisional application Serial No. 60/086,629, filed May 23, 1998.

FIELD OF INVENTION

The present invention relates to high heat transfer rate convection ovens utilizing heated jets of air to cook food product and incorporating grease and smoke management features to prevent undesired off-flavor in the food product.

BACKGROUND OF THE INVENTION

The present invention relates to a high velocity convection oven capable of cooking foods that are traditionally cooked by deep fat frying methods, without producing undesired smoke and smoke flavor in the food. More specifically, the oven of the present invention produces high velocity jets of air to cook food product while the food product is moved relative to the air jets, with the preferred method of moving food product being a conveyor assembly. High velocity convection ovens of this type are generally referred to as impingement ovens.

In sum, the oven is characterized by its production of very high transfer rates needed for cooking traditionally deep fat fried foods with air. While conventional impingement type ovens (e.g., see U.S. Pat. No. 4,338,911) have been known to produce heat transfer rates in the range of 12–15 (as measured by a heat transfer rate measurement device of the type described in U.S. Pat. No. 5,161,889), the oven of the present invention is capable of producing heat transfer rates of up to 25 and greater. At the same time, the present oven design also has features which control the amount of smoke produced in the cooking cavity, thereby reducing or eliminating the off-flavor that could be caused by the smoke.

Further, the oven includes dual cavities surrounding the cooking chamber through which room temperature air is circulated. This "cool skin" feature cools the interior walls of the cooking chamber to promote grease collection and retard smoke production. This feature also cools the exterior walls of the oven making the oven safer for use. In addition, the oven of the present invention features an improved air delivery (duct) design that produces more even distribution of temperature controlled cooking gasses to the food product and self-cleaning capabilities using pyrolytic cleaning methods.

SUMMARY OF THE INVENTION

The present invention relates to a convection heating apparatus with smoke and grease management means and an improved temperature controlled gas delivery system. The apparatus includes an exterior cabinet, an interior chamber and intermediate walls disposed between the exterior cabinet and interior chamber such that an intermediate cavity is provided between the interior chamber and intermediate walls and an outer cavity is provided between the exterior cabinet and intermediate walls. The apparatus further includes a product support, preferably a conveyor, disposed in the interior chamber. A blower for circulating temperature controlled gas into said interior chamber is also provided which is in fluid communication with at least one duct (preferably a plurality) having a jet plate with orifices positioned to direct temperature controlled gas toward the product support. The apparatus further includes second blower capable of circulating air through the outer cavity and intermediate cavity thereby cooling the exterior cabinet walls and interior chamber walls. In one embodiment of the invention, separate blowers are used to circulate air through the outer cavity and through the intermediate cavity of the apparatus.

In a preferred embodiment of the invention, a single blower is used to circulate air through the outer and intermediate cavities and a diverter vane is used to control the amount of air circulated through the outer and intermediate cavities.

In another embodiment of the invention the oven further includes an exhaust conduit for exhausting at least a portion of the temperature controlled gas (i.e., the cooking gas) from the oven. In a preferred construction, the apparatus further includes a conduit means whereby a portion of the air circulated through the outer cavity and/or through the intermediate cavity is mixed with the exhausted portion of temperature controlled gas thereby reducing the temperature of the exhaust stream.

In another preferred embodiment of the invention, the apparatus may include a catalytic converter positioned to treat the exhausted portion of temperature controlled gas.

In alternative preferred embodiments of the invention, the apparatus may also include a cyclonic separator positioned downstream of the exhaust conduit, an interior chamber with an inclined floor and drain pipe leading out of said oven and a water conduit for cleaning purposes.

The invention further includes methods of heating a food product with the apparatus described herein and cleaning said oven. Generally, the method of cooking includes: providing a food product the product support; circulating heated gas into the interior chamber; and controlling the temperature of the interior walls the oven by circulating air through the intermediate cavity. In a preferred method of cooking, air is also circulated through the outer cavity of the apparatus to control the temperature of the exterior walls.

In the method of cleaning the oven air is circulated through the outer cavity of the oven, the interior chamber temperature is elevated and air flow through the intermediate cavity is restricted to allow the interior chamber walls to reach an elevated pyrolytic cleaning temperature. In a preferred embodiment, the temperature is elevated in steps.

In another aspect of the invention, an improved air delivery duct is provided having a proximal end and a distal end and a length extending between said proximal end to said distal end. The duct has an inlet opening adjacent said proximal end through which temperature controlled gas (cooking gas) and has a plurality of orifices along its length through which the gas may exit. The duct has a first tapered portion adjacent the proximal end and a second tapered portion adjacent the distal end, with first tapered portion having a greater angle of taper than the second tapered portion.

I another aspect of the invention the oven includes a perforated filter plate disposed within the interior chamber or, alternatively a plurality of inclined louvers, separating the interior chamber into a cooking chamber and an air return chamber. To increase the capture of entrained food particles the plate has a plurality of bends, preferably an accordion fold configuration.

In yet another aspect of the invention, the oven includes at least one catalytic converter disposed in the temperature controlled gas return path.

BRIEF DESCRIPTION OF DRAWINGS

For a more complete understanding of the present invention, and for further advantages thereof, reference is now made to the following description, taken in conjunction with the accompanying drawings, in which:

FIG. 16 shows multiple views of the heat slinger component of the present invention;

FIG. 19 shows multiple views of a jet plate of the present invention;

FIG. 25 is a side view of a preferred duct design for the oven of the present invention;

FIG. 26 shows multiple views of a filter assembly of the present invention;

FIG. 27 shows multiple views of a filter assembly of the present invention;

Figure 1:
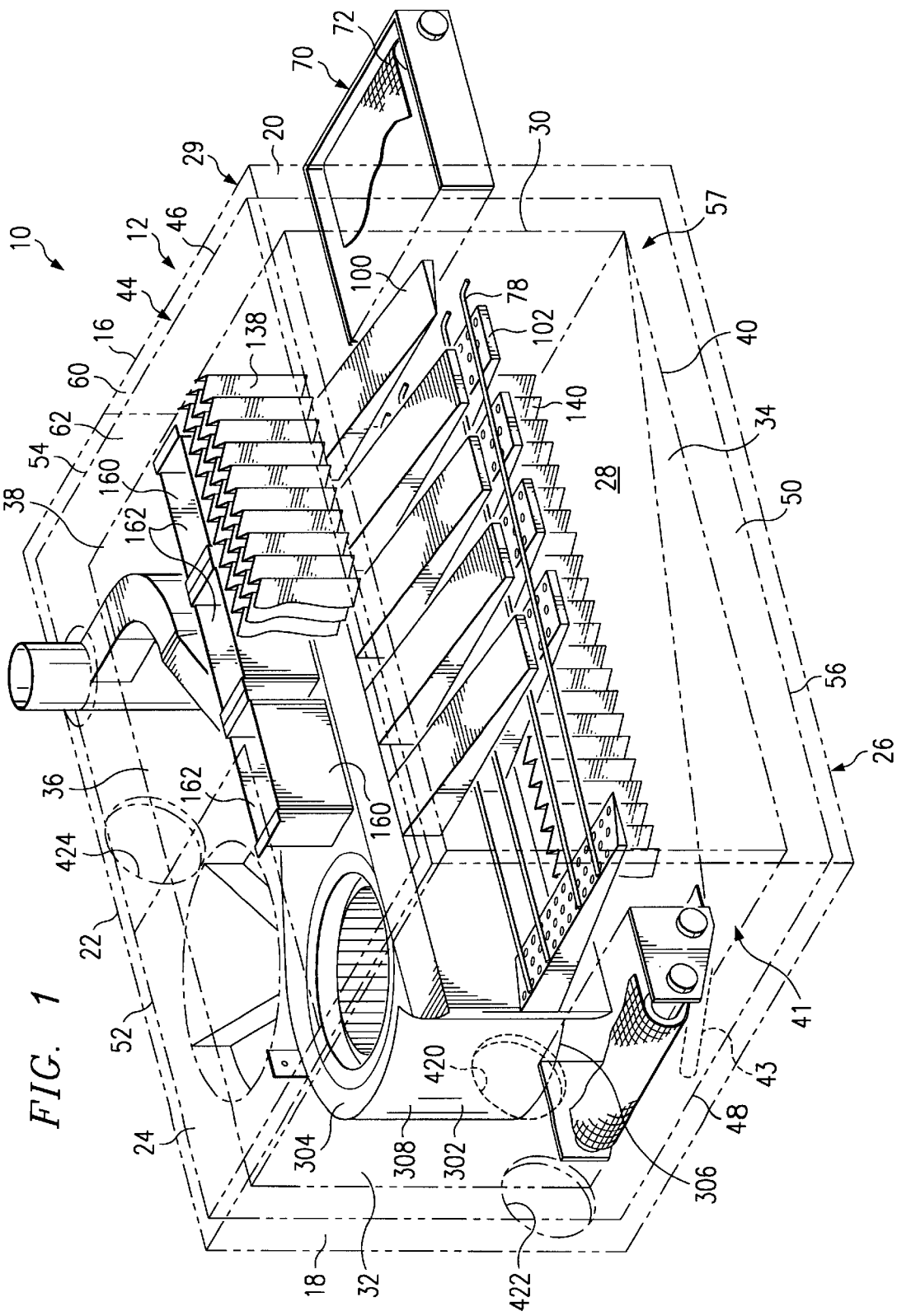
FIG. 1 is a perspective view of the oven of the present invention partially depicting components thereof.
Figure 2:
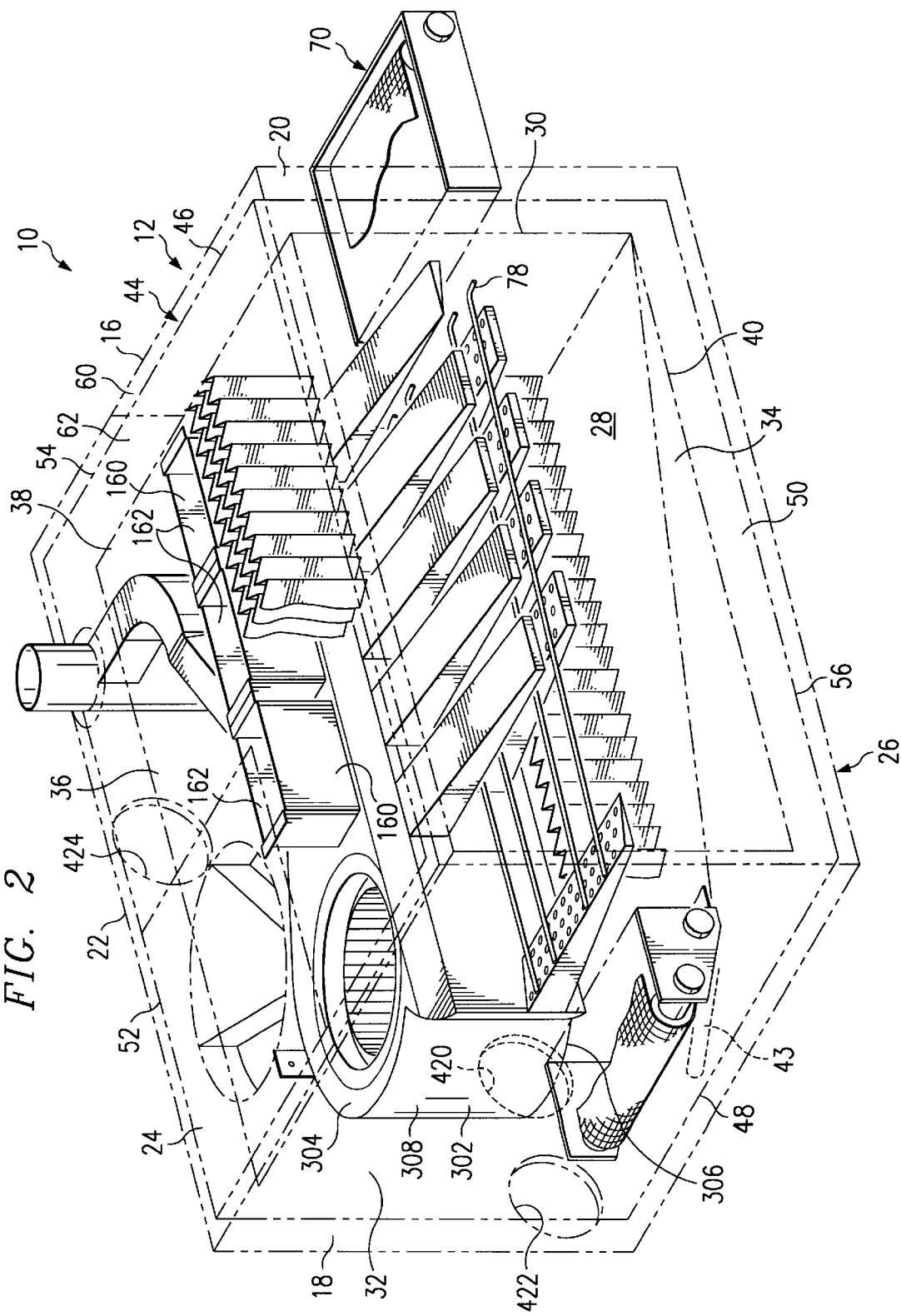
FIG. 2 is a perspective view of the oven of the present invention partially depicting components thereof.

A detailed description of the oven is provided below.

DETAILED DESCRIPTION OF THE INVENTION

Drawings of preferred embodiments of the invention are annexed hereto so that the invention may be better and more fully understood. FIGS. 1–10 depict a larger, gas heated version of an oven embodying the present invention. FIGS. 11–23 depict a smaller, electrically heated version of an oven embodying the present invention. FIGS. 24–34 depict general representations of both gas and electrically heated ovens and components thereof. Because most of the structures and parts of these two embodiments differ only in regard to size and numbers the same numeral references will be used for both embodiments to designate like parts and structures throughout the figures of the drawings. Any significant differences between the gas heated and electrically heated embodiments shall be expressly discussed herein.

Referring to FIGS. 1–13 and 30–33, there is shown the oven 10 of the present invention. Oven 10 includes an exterior cabinet 12 defined by exterior side walls 16 and 18, exterior front wall 20, exterior rear wall 22, exterior top wall 24, and exterior bottom wall 26, all spaced from each other (hereinafter collectively referred to as the "exterior walls 29" of the cabinet or oven). The configuration of cabinet 12 may vary depending upon the type of oven installation. Generally, cabinet 12 will comprise rectangularly-shaped exterior walls and be of a box shape. Particularly suitable materials for the exterior walls include aluminized steel and stainless steel. Eyelids 27 (FIGS. 29 and 31), composed of sheet stainless steel, are adjustably mounted to the exterior side walls adjacent the exit and entrance openings in the oven by screw means or other suitable means. The adjustable eyelids or covers can be moved to substantially cover the entrance and exit openings when desired, such as during the pyrolytic cleaning operation of the oven.

Figure 30:
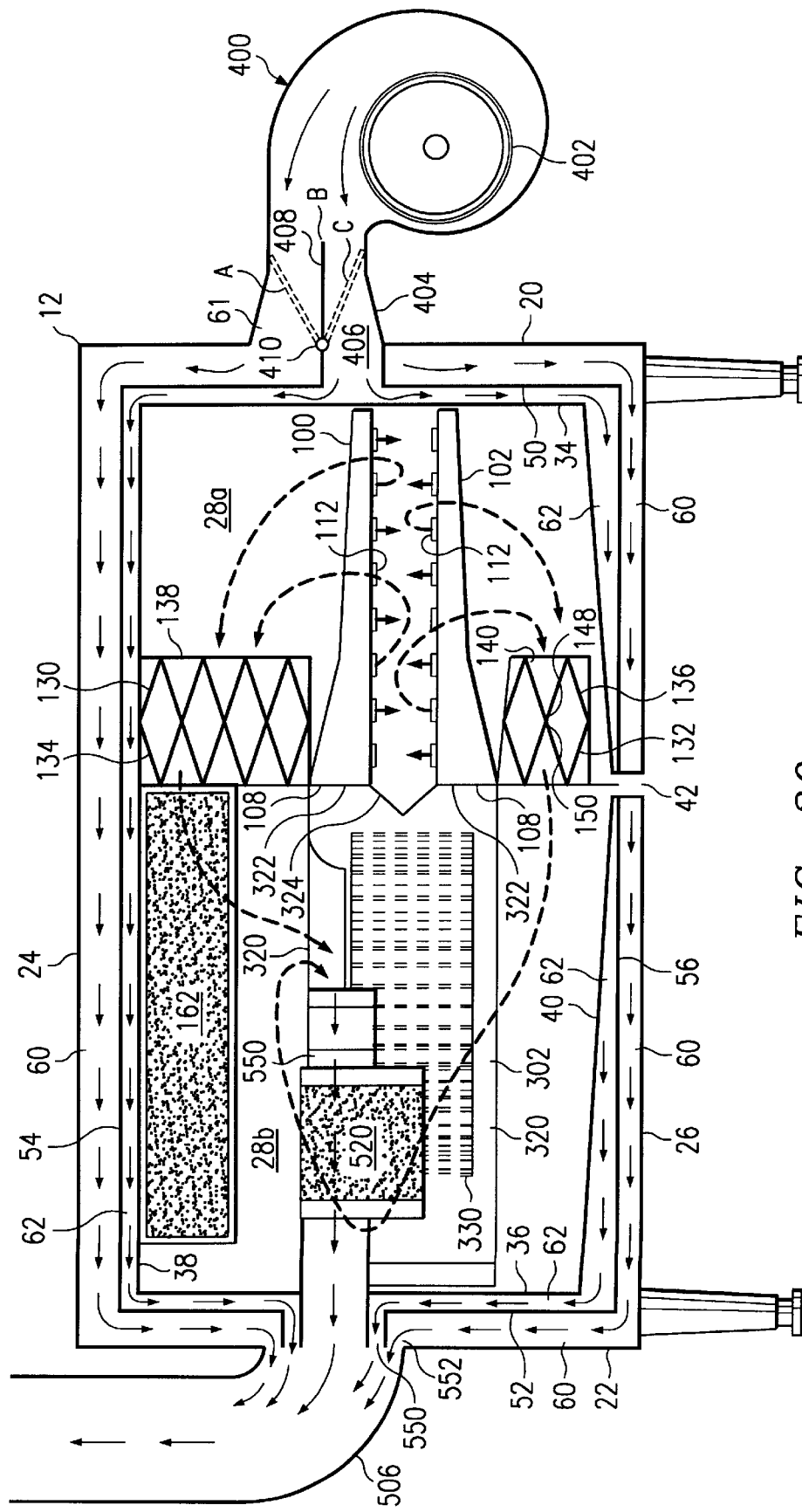
FIG. 30 is a view of oven of the present invention depicting air flow through said oven.

Oven 10 further includes an interior chamber 28 defined by interior side walls 30 and 32, interior front wall 34, interior rear wall 36, interior top wall 38, and interior bottom wall 40 spaced from each other (hereinafter collectively referred to as the "interior walls 41" of the interior chamber or oven). As shown in FIG. 30, the interior chamber 28 is divided into a cooking chamber 28a and air return chamber 28b. Bottom wall 40 is sloped downwardly toward drain opening 42 which has connected thereto drain pipe 43 extending through the intermediate and exterior bottom walls 56 and 26, respectively. Preferably, the slope angle for bottom wall 40 is between about 2–10 degrees, with an angle of about 2–4 degrees being preferred. Particularly suitable materials for the interior walls of the interior chamber include aluminized steel and stainless steel.

Disposed between the exterior and interior walls of the oven is intermediate shell 44 defined by intermediate side walls 46 and 48, intermediate front wall 50, intermediate rear wall 52, intermediate top wall 54, and intermediate bottom wall 56 spaced from each other (hereinafter collectively referred to as the "intermediate walls 57" of the oven). Particularly suitable materials for the intermediate walls include aluminized steel and stainless steel.

Figure 35:
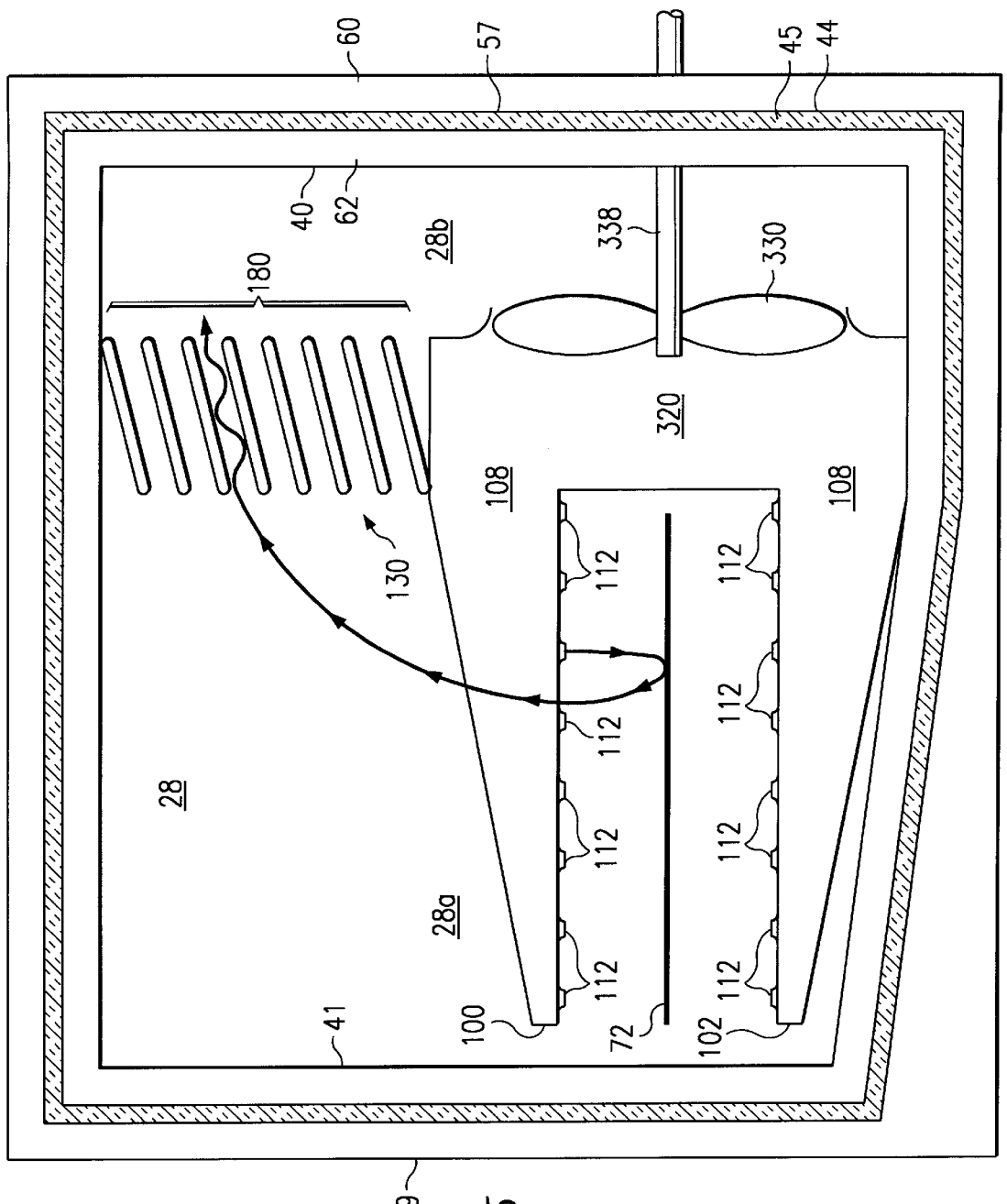
FIG. 35 is a cross section (side view) of an embodiment of the present invention partially depicting components thereof.

It has also been found that the intermediate walls can be constructed of an insulating board material 45 such as Marinite board. Alternatively, an insulating board, such as Marinite board, may be mounted in an abutting relationship with the intermediate walls (FIG. 35). This alternative design has been found to improve the performance of the oven in that the exterior wall temperature is reduced while allowing higher temperatures to be maintained in the cooking chamber, thus allowing smaller blowers to be used for circulation of air through the outer and intermediate cavities.

Figure 7:
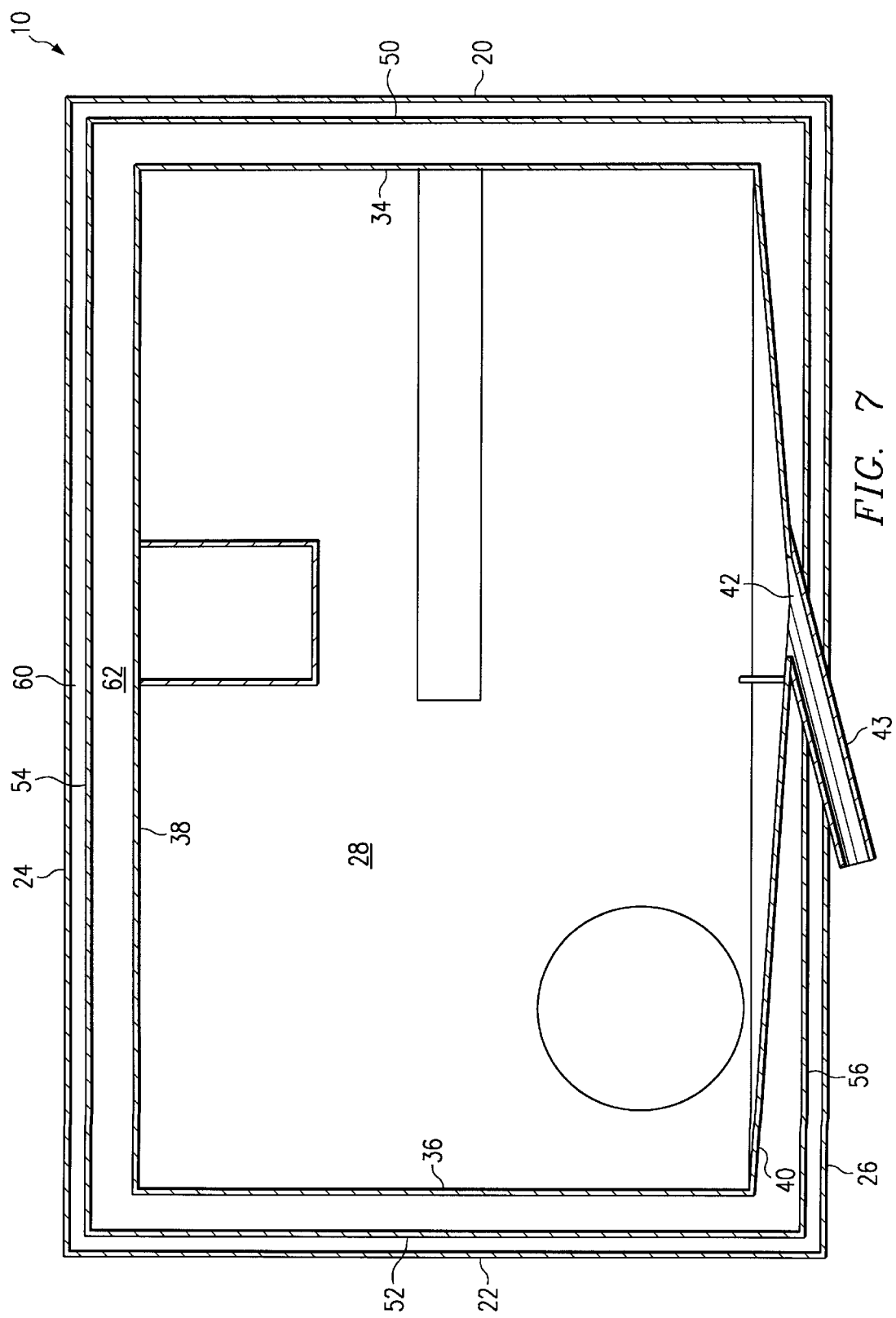
FIG. 7 is a cross section view of the oven of the present invention partially depicting components thereof.
Figure 13:
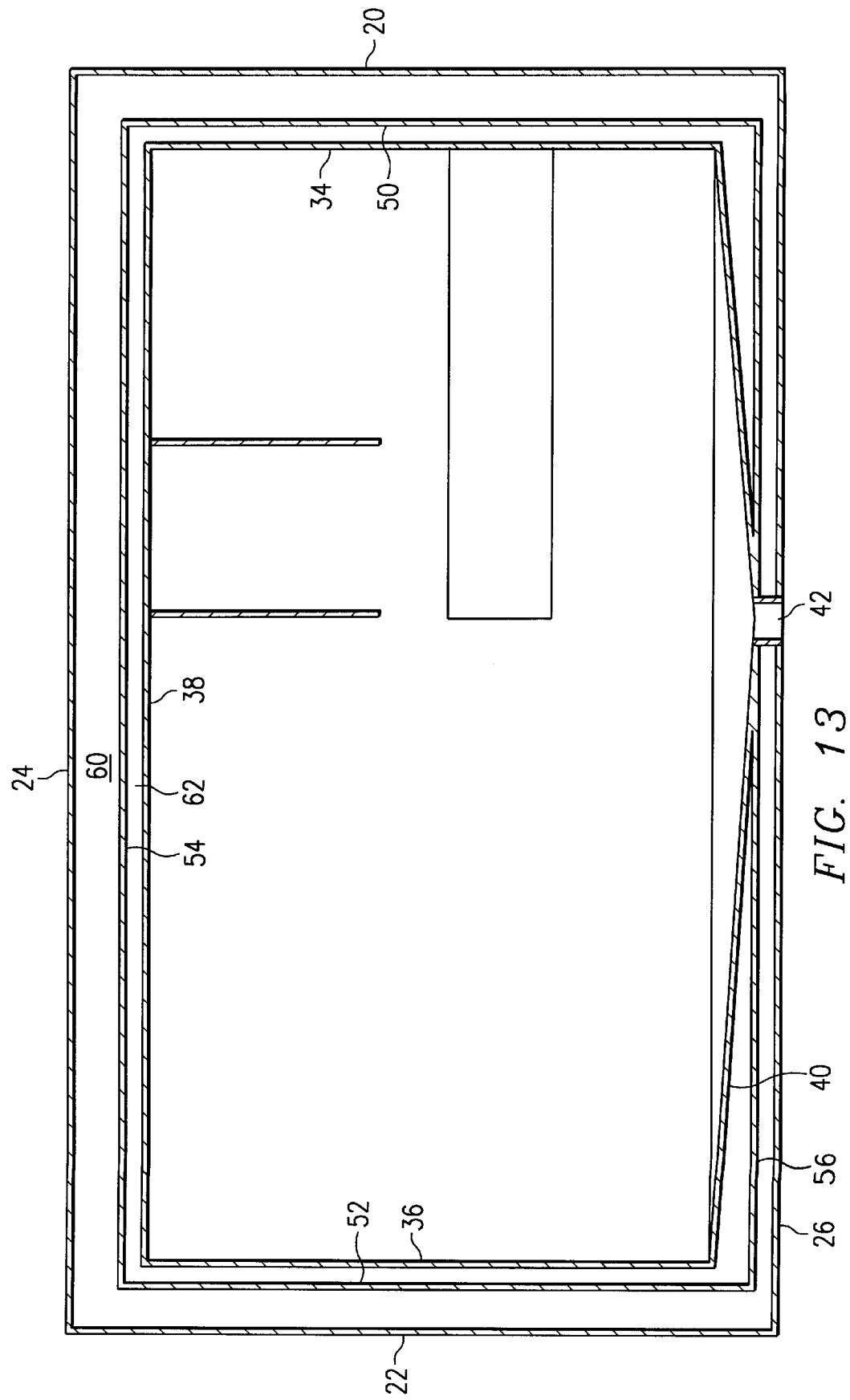
FIG. 13 is a cross section view of the oven of the present invention partially depicting components thereof.
Figure 14:
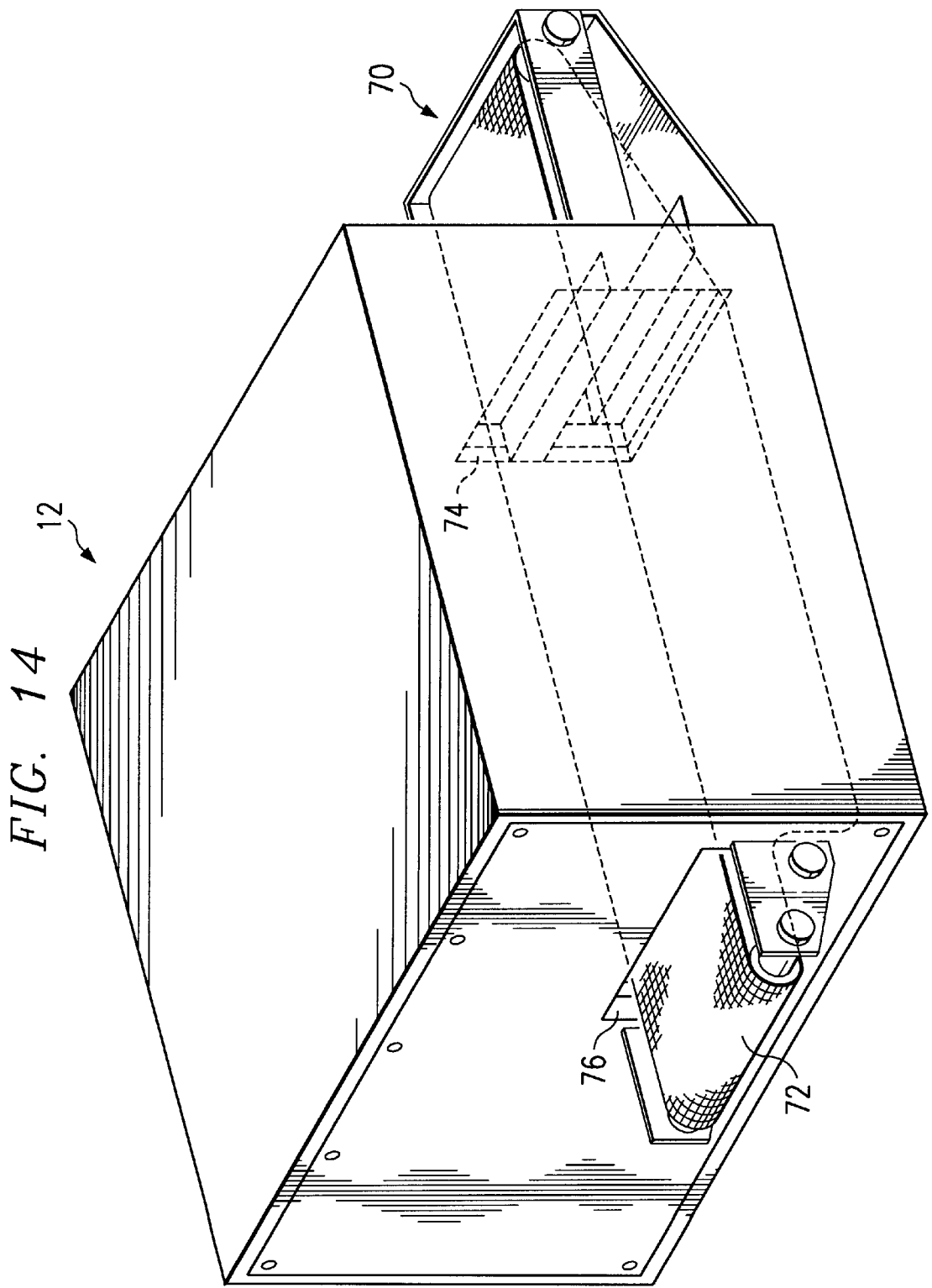
FIG. 14 is a perspective view of the oven of the present invention partially depicting the components of the conveyor assembly thereof.

As shown best in FIGS. 7, 13 and 30, the space between the exterior walls and intermediate walls defines an outer cavity 60. The space between the intermediate walls and interior walls defines an intermediate cavity 62. In the embodiments shown there is no fluid communication between the intermediate cavity, outer cavity and the cooking chamber.

As shown in FIGS. 1–2, 14, and 31, food products are transported into and through cooking chamber 28a by conveyor assembly 70 of conventional design (e.g., see U.S. Pat. No. 4,338,911 and U.S. Pat. No. 4,462,383, hereby incorporated by reference). As shown, conveyor assembly 70 preferably comprises a continuous loop wire mesh conveyor belt 72 which extends through entrance opening 74 and exit opening 76 in the oven and is horizontally disposed as it travels through cooking chamber 28a. A conventional flat-flex stainless steel wire mesh belt is suitable. The width of the belt is a matter of choice, but a belt width of about 12–16 inches is very suitable for the larger gas heated oven and a belt width of about 9–12 inches is very suitable for the smaller electrically heated oven. Conveyor belt 72 is supported by rails 78 and can be driven by a conventional variable speed electric motor. Rails 78 can be mounted in the oven by welding them to lower ducts 102 or using other conventional means to secure the rails in the oven. Preferably, the conveyor assembly extends a sufficient distance from the exit and entrance openings in the oven to allow food products to be readily positioned on the conveyor belt for travel through the cooking chamber of the oven and removal upon exiting the oven.

With respect to the conveyance of food product through the oven, it is desirable to incorporate a programmable conveyor speed controller to control cook time. Such controllers are well known in the field of conveyorized impingement ovens. Such controllers can be calibrated to indicate the time the food product is to remain in the oven depending upon the requirement for a particular food product.

Disposed within cooking chamber 28a and in fluid communication with plenum 320 are upper air dispensing ducts (or fingers) 100 disposed above conveyor belt 72 and lower air dispensing ducts (or fingers) 102 disposed below conveyor belt 72. These ducts can be constructed of any of several known materials capable of withstanding and performing under the high temperature conditions of the oven, such as aluminized steels and stainless steels. Ducts 100 and 102 are hollow and arranged to direct jets of heated air against the surface of food product on the conveyor belt. As shown, the ducts are preferably tapered along their respective longitudinal axes, with the cross sectional area (perpendicular to longitudinal axes) of the ducts being greater at their respective proximal ends 104 (i.e., the ends adjacent plenum 320) and smaller at their distal ends 106. Ducts 100 and 102 are welded or otherwise secured to wall 310 with inlet openings 108 of the ducts adjacent to and in fluid communication with outlet opening 322 in plenum 320. Each of the hollow tapered fingers 100 and 102 have a perforated surface or jet plate 110 facing the conveyor belt in which orifices or openings 112 are formed. Openings 112 are designed to direct streams of heated air against a food product being transported on the conveyor belt.

Figure 8:
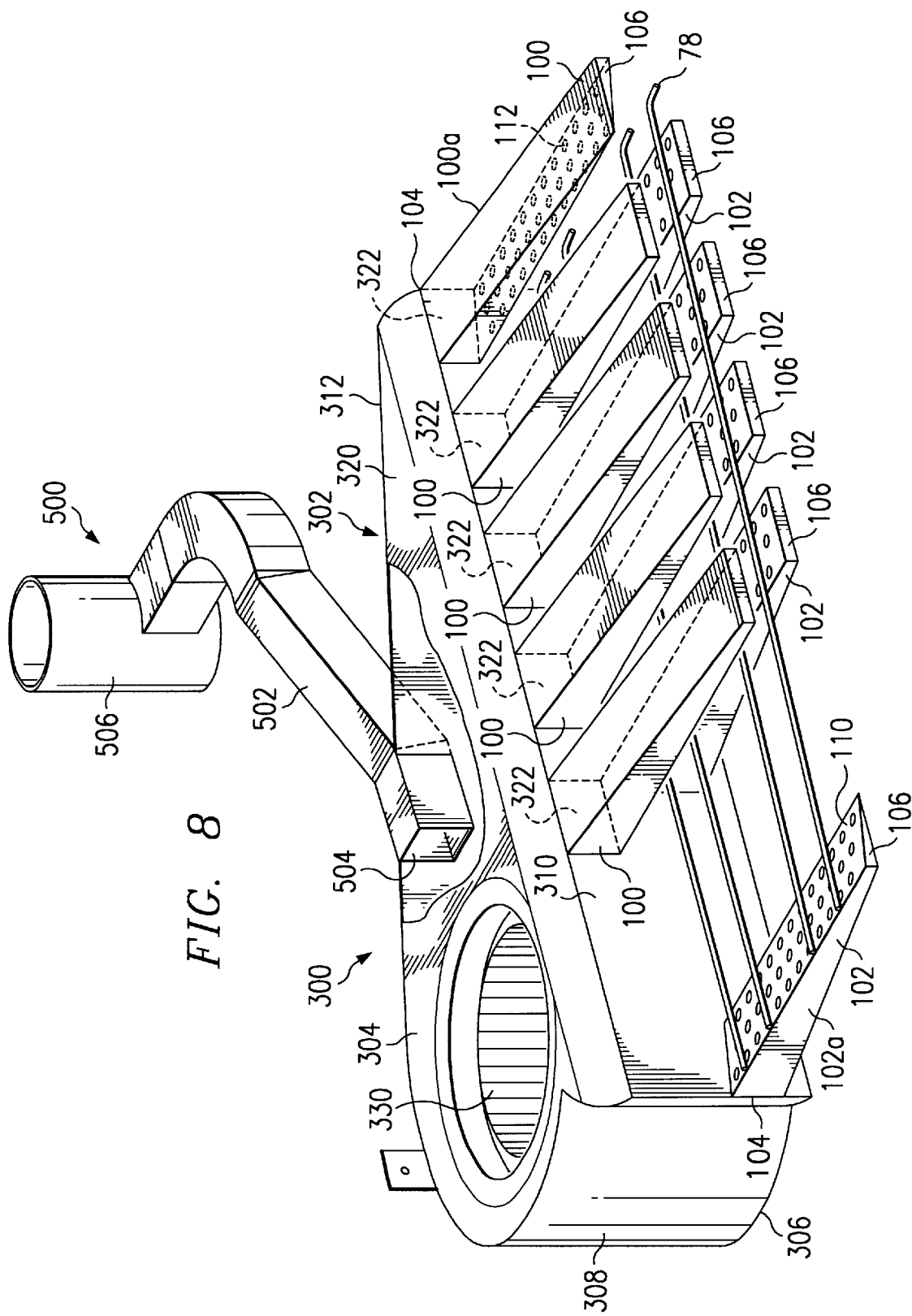
FIG. 8 is a perspective view of the blower assembly and exhaust assembly of the present invention partially depicting components thereof.
Figure 9:
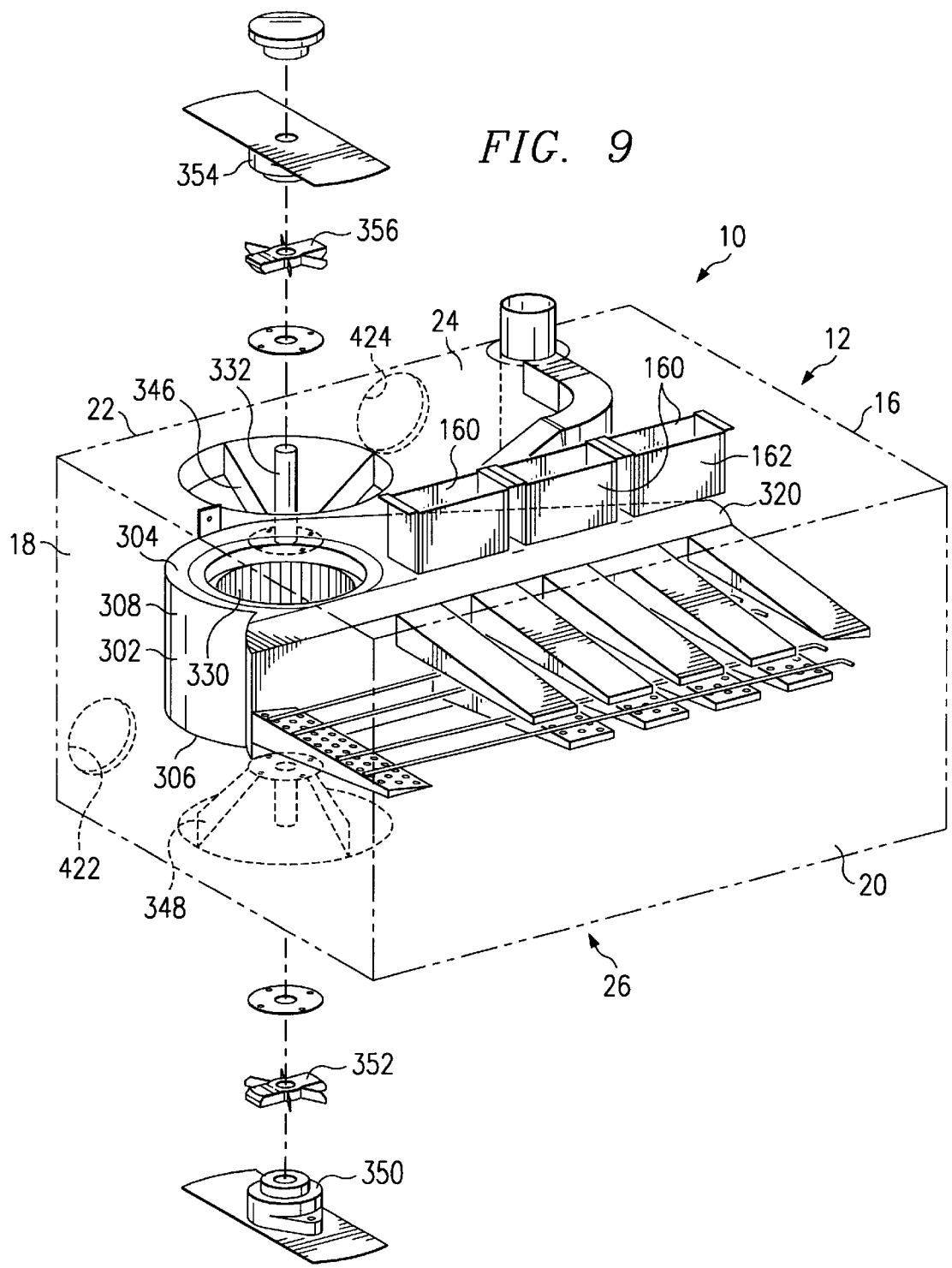
FIG. 9 is a perspective view of the oven of the present invention partially depicting components thereof.
Figure 10:
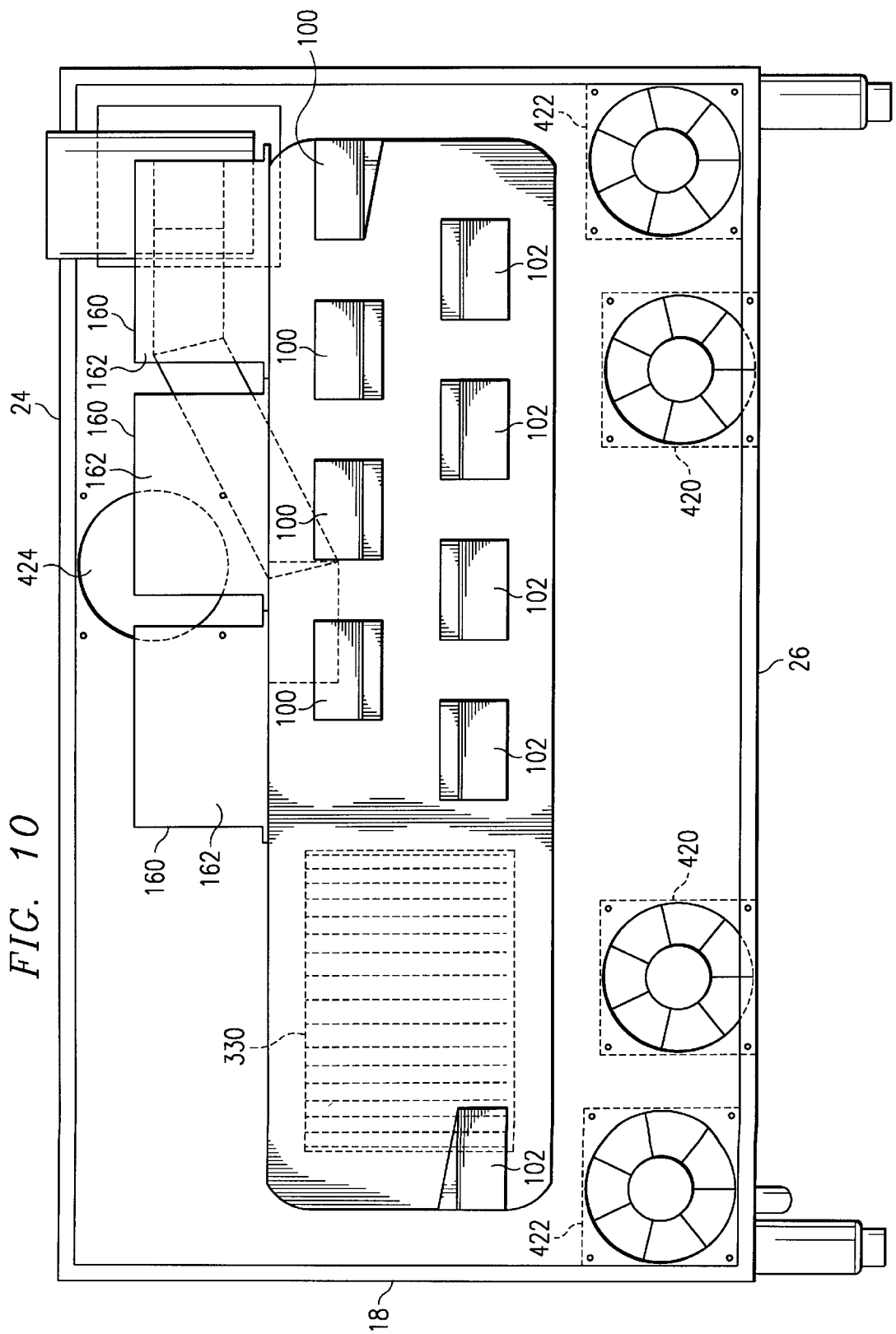
FIG. 10 is a cross section view of the oven of the present invention partially depicting components thereof.
Figure 11:
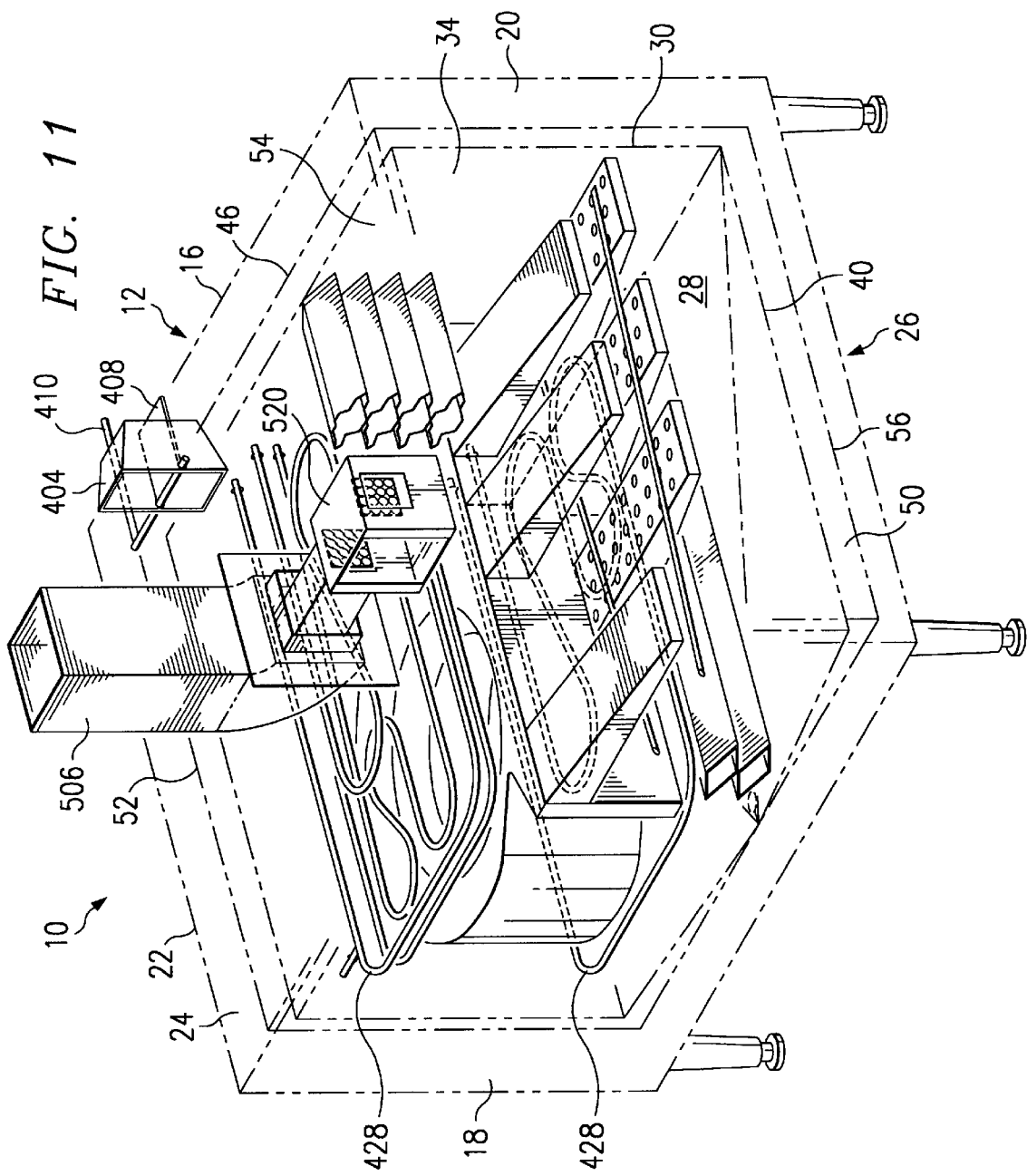
FIG. 11 is a perspective view of the oven of the present invention (electric version) partially depicting components thereof.
Figure 12:
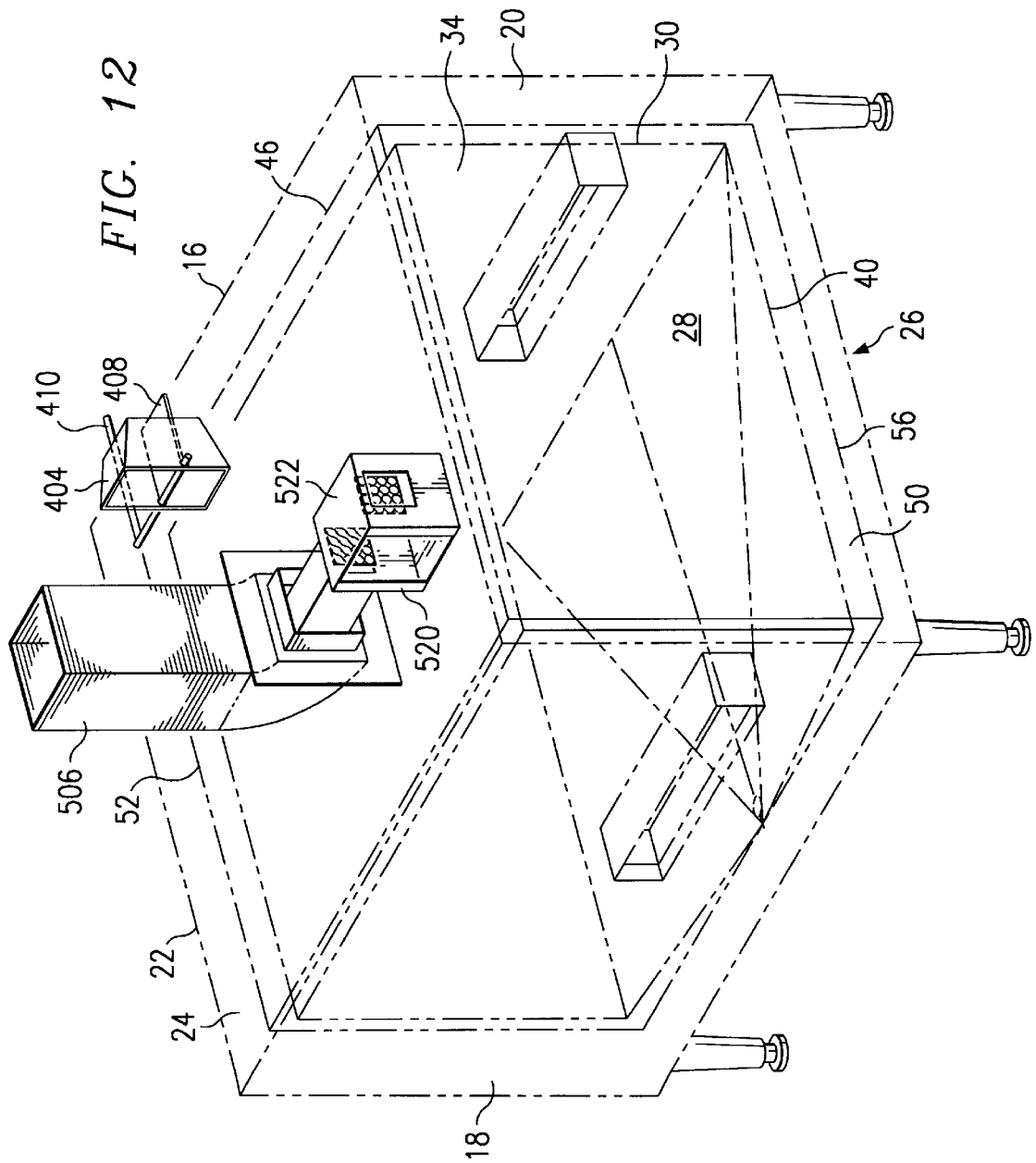
FIG. 12 is a perspective view of the oven of the present invention (electric version) partially depicting components thereof.
Figure 21:
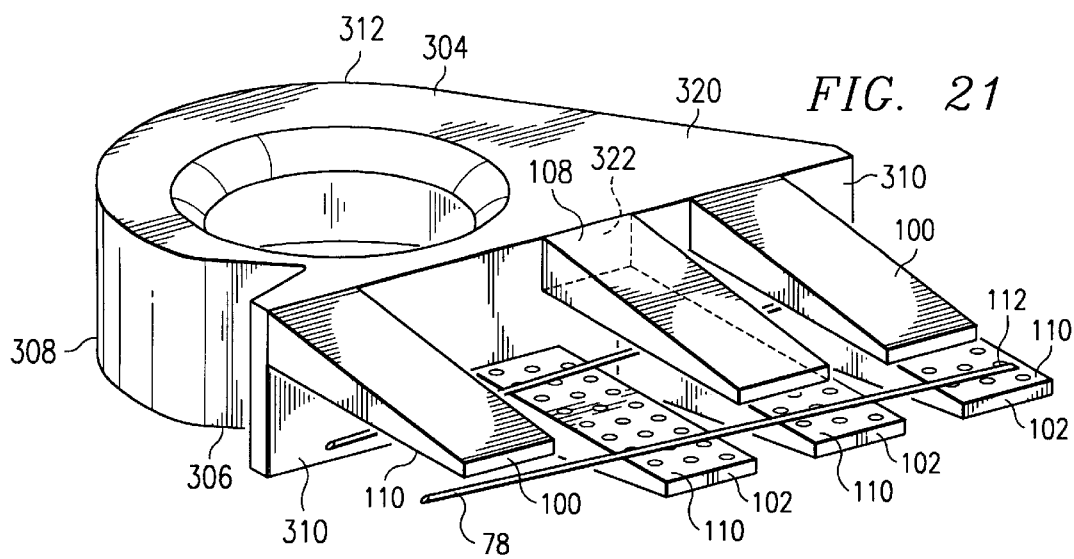
FIG. 21 is a perspective view of the blower housing, plenum assembly and air delivery ducts of the present invention.
Figure 22A:
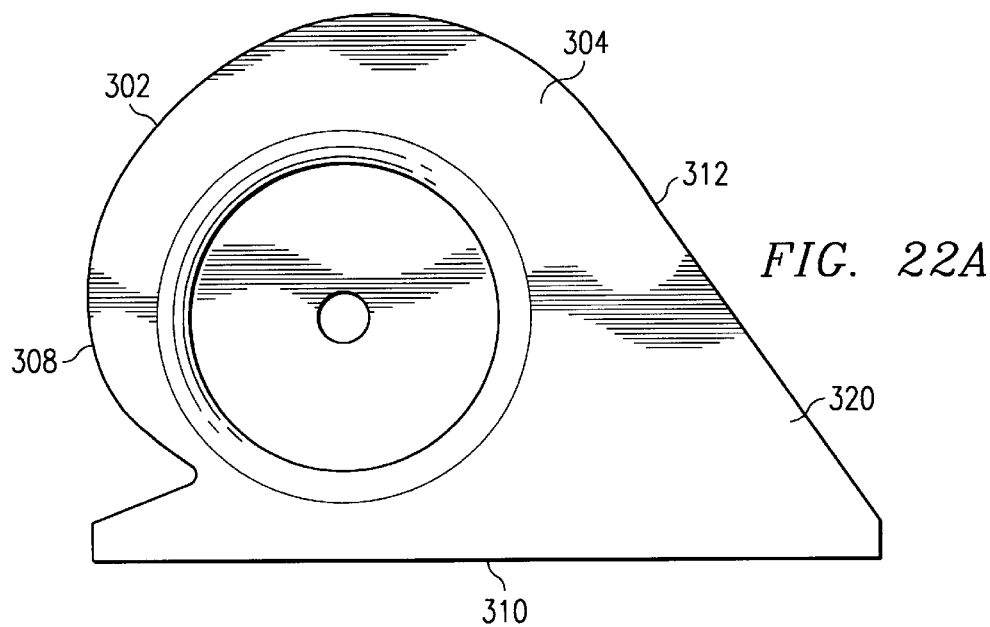
FIG. 22 shows multiple views of blower housing and plenum assembly of the present invention.
Figure 22B:
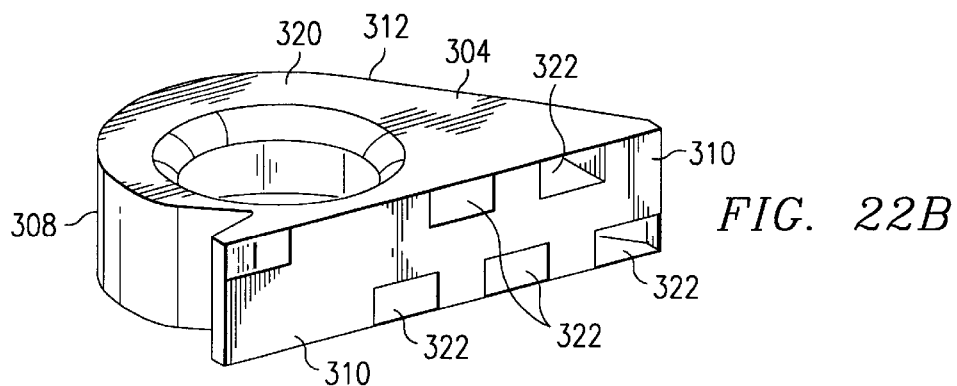
Figure 23:
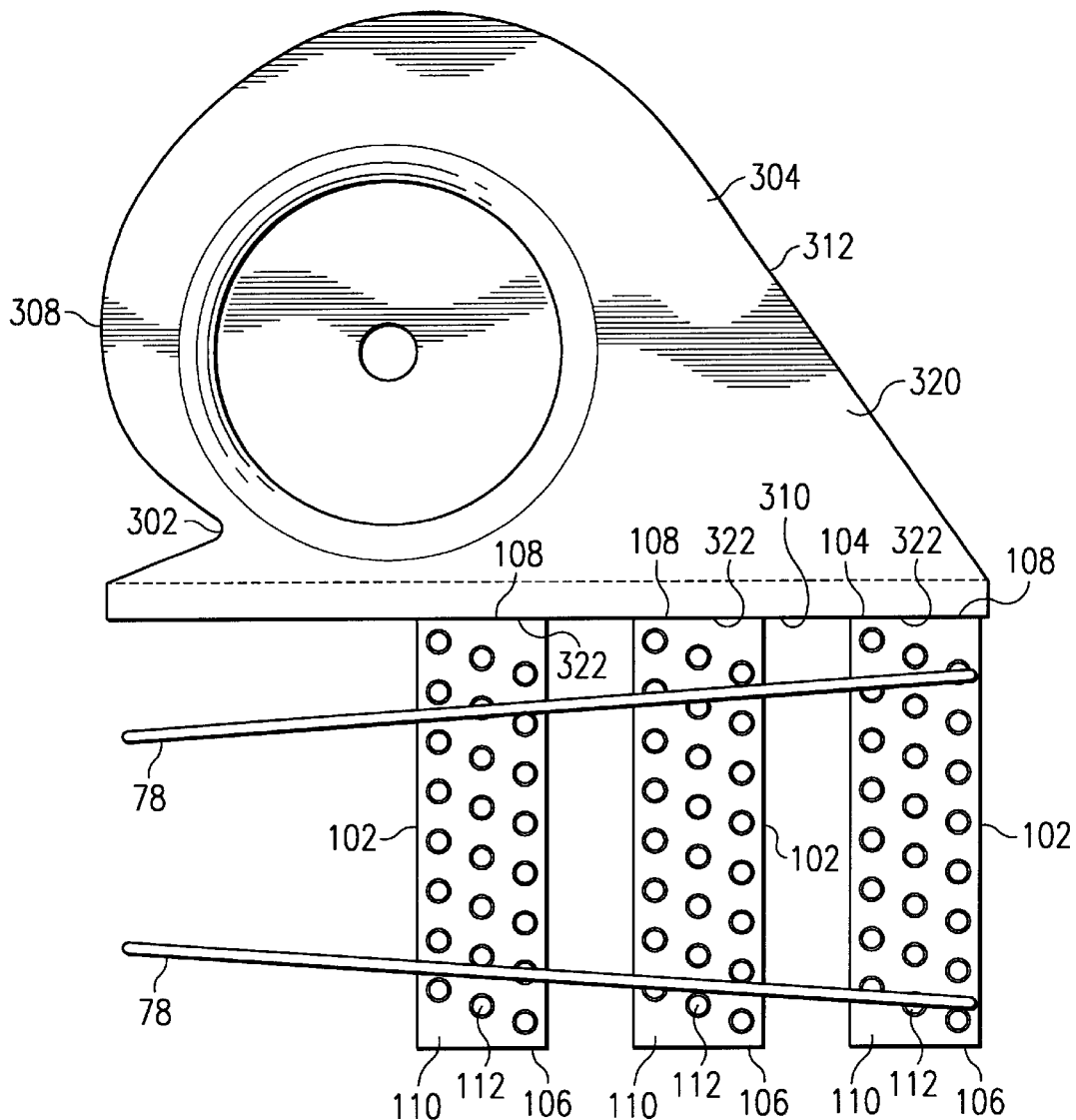
FIG. 23 is a top view of the blower housing, plenum assembly and air delivery ducts of the present invention.

The number, size and arrangement of the ducts 100 and 102 can vary depending on the size of the oven and the desired results. FIG. 8 depicts a preferred air duct arrangement for a larger, gas heated oven having a conveyor width of about 14 inches, a length of about 36–38 inches (side wall to side wall), a height of about 22 inches and a width of about 32 inches. As shown, the gas heated oven includes six ducts above the conveyor assembly and six ducts below the conveyor assembly. In contrast, the smaller electric oven is approximately 22–24 inches long, about 15 inches in height, about 28 inches wide and has three fingers above and three fingers below the conveyor belt (FIG. 21).

The distance from the upper jet plate to the conveyor belt is approximately 1 inch. Likewise, the distance between the lower jet plates and conveyor belt is 1 inch. Further, note that fingers 100 and 102 are disposed above and below the conveyor assembly in non-opposing positions. That is, the upper and lower fingers are staggered. Also, note the absence of fingers extending continuously to the exit opening of the oven adjacent the blower assembly. It has been found that the blower creates a suction effect in this region make the placement of fingers in this region ineffective.

Figure 20A:
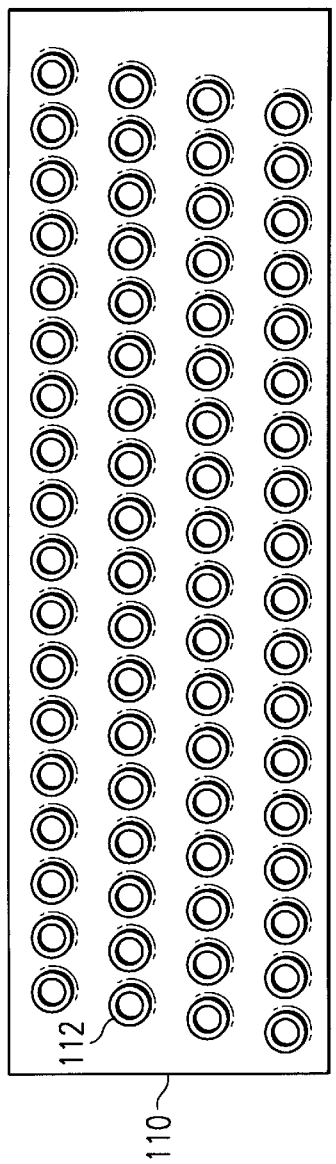
FIG. 20 shows multiple views of a jet plate of the present invention.
Figure 20B:
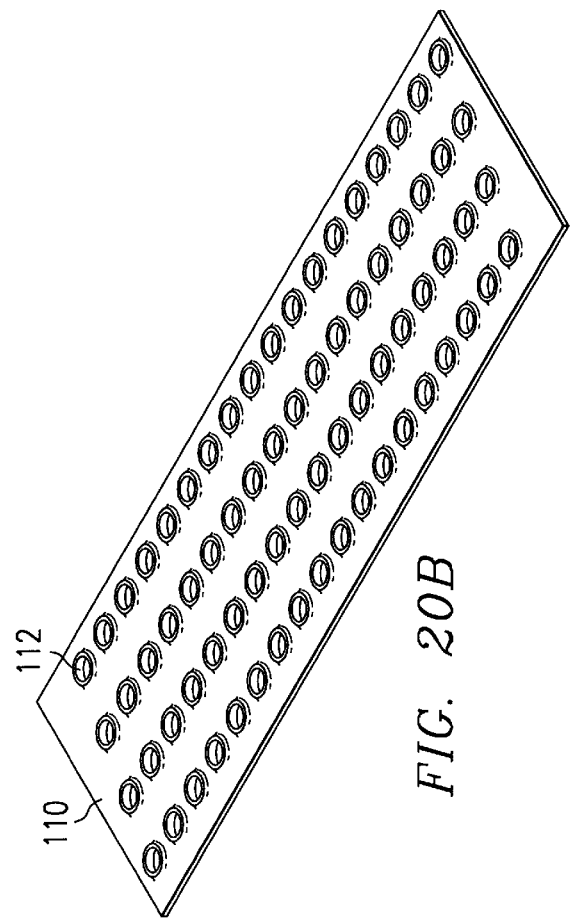

In a preferred embodiment, the openings 112 in jet plates 110 comprise circular nozzles as shown in FIGS. 19 and 20, with the centers of the openings being spaced apart a distance not exceeding four times the diameter of the openings. Specifically, upper air duct 100 has a plurality of nozzles 112 directed downwardly toward the conveyor belt 72. Lower air ducts 102 have a plurality of nozzles 112 directed upwardly toward the conveyor belt. FIG. 19 shows a preferred arrangement of the nozzles 112 wherein the nozzles are arranged in three rows from distal end to proximal end with the rows being offset from each other. The nozzle openings have approximate diameters of 0.44 inches and extend about ⅛" from the jet plate surface in the direction of the conveyor. In this preferred embodiment, the rows of nozzles are offset by about 0.383 inches from the adjacent row and the rows are spaced about one inch apart, taken from lines drawn through each row at the center of the nozzles. As stated, the size, number, and arrangement of the nozzles may vary. The illustrated jet plate and nozzle arrangement is a preferred arrangement for an oven having fingers with 10" jet plates. Another arrangement is shown in FIG. 20.

In another preferred embodiment of the invention, upper and lower ducts 100a and 102a closest to the exit and entrance openings 76, 74 are shaped to angle inwardly from the exit and entrance openings (FIG. 8). The angle of the jet plate surface in ducts 100a and 102a is such that the escape of heated air from the entrance and exit openings is minimized. Preferably, the perforated surface of the angled ducts is inclined toward the interior of the chamber at an angle in the range of 3° to 30° relative to the vertical plane of the exit and entrance openings. With the air streams inclined toward the interior of the oven, most of the hot air returned to the interior of the oven.

Figure 24A:
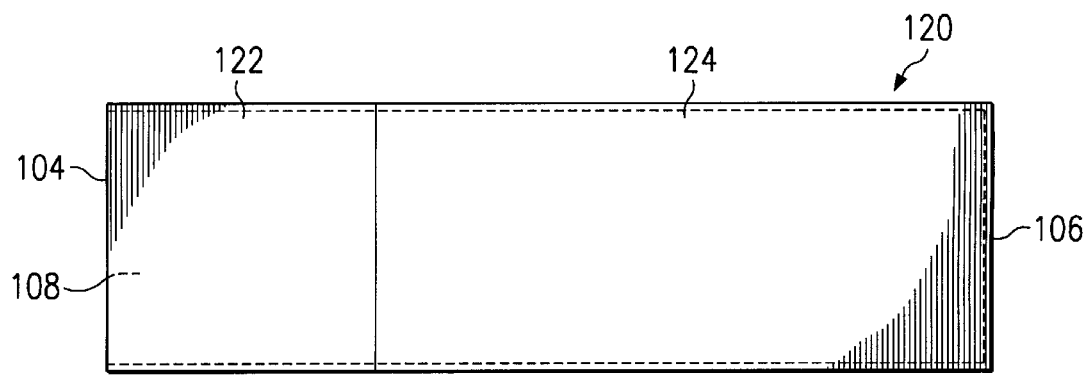
FIG. 24 shows multiple views of a preferred duct design for the oven of the present invention.
Figure 24B:
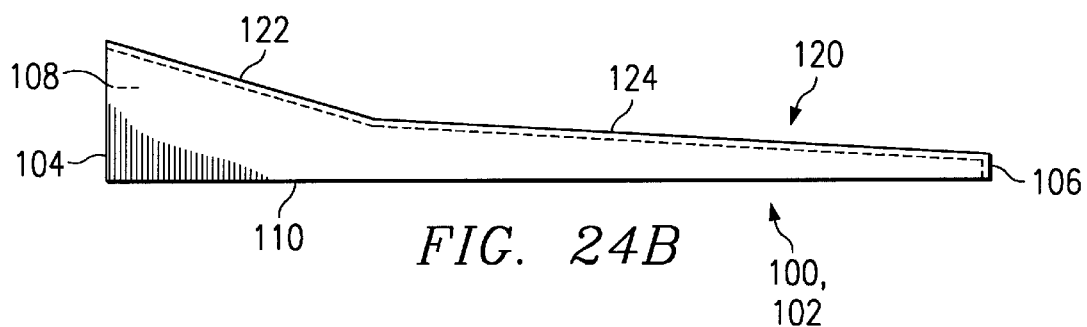
Figure 24C:
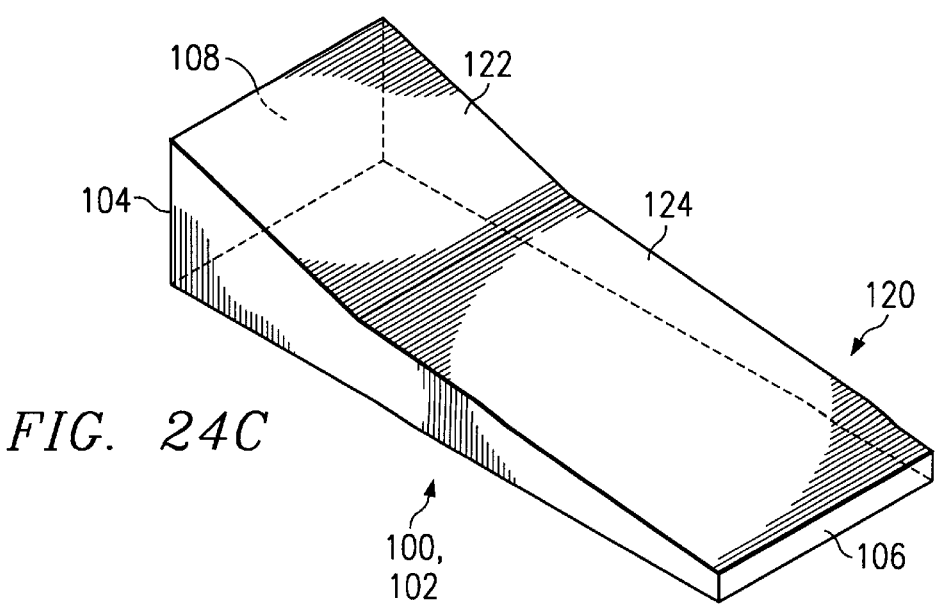

In a most preferred embodiment of the present invention, the ducts 100 and 102 have a dual taper configuration. As shown in FIGS. 24 and 25, the dual tapered duct 120 has a first tapered portion 122 adjacent the proximal end 104 of the duct and a second tapered portion 124 adjacent the distal end 106 of the duct. As shown, the first tapered portion 122 has a greater angle of taper than the second tapered portion 124 which has a gentler slope. The first tapered portion 122 extends approximately one-quarter to one-half of the length of the duct. The degree of taper in the first and second tapered portions may vary. Preferably, the first tapered portion 122 tapers down 1 inch for every 1.5 to 3 inches of length and the second tapered portion 124 tapers 1 inch for every 7 to 16 inches of length. This dual taper duct configuration has been found to provide improved evenness of air flow from the openings along the length of the ducts and thus improves evenness of cooking.

Referring to FIGS. 3, 26–27, and 30 disposed above upper ducts 100 and below lower ducts 102 are filter assemblies 130 and 132, respectively. Filter assemblies 130, 132 separate the cooking chamber 28a from the return air chamber 28b of the oven and comprise a plurality of accordion-folded, perforated plates 134 and 136 secured within frames 138, 140 which are mounted to top and bottom interior walls 38, 40, respectively, by suitable means such as welding. Folded plates 134 and 136 can be constructed of any material capable of withstanding the high temperatures associated with the oven. The preferred material is carbon steel. Stainless steel is another suitable material. As shown in greater detail in FIG. 27, the perforations 142 in the plates are formed by rows of punch-out sections 143 extending from a first side 144 and second side 146 in alternating fashion.

Figure 3:
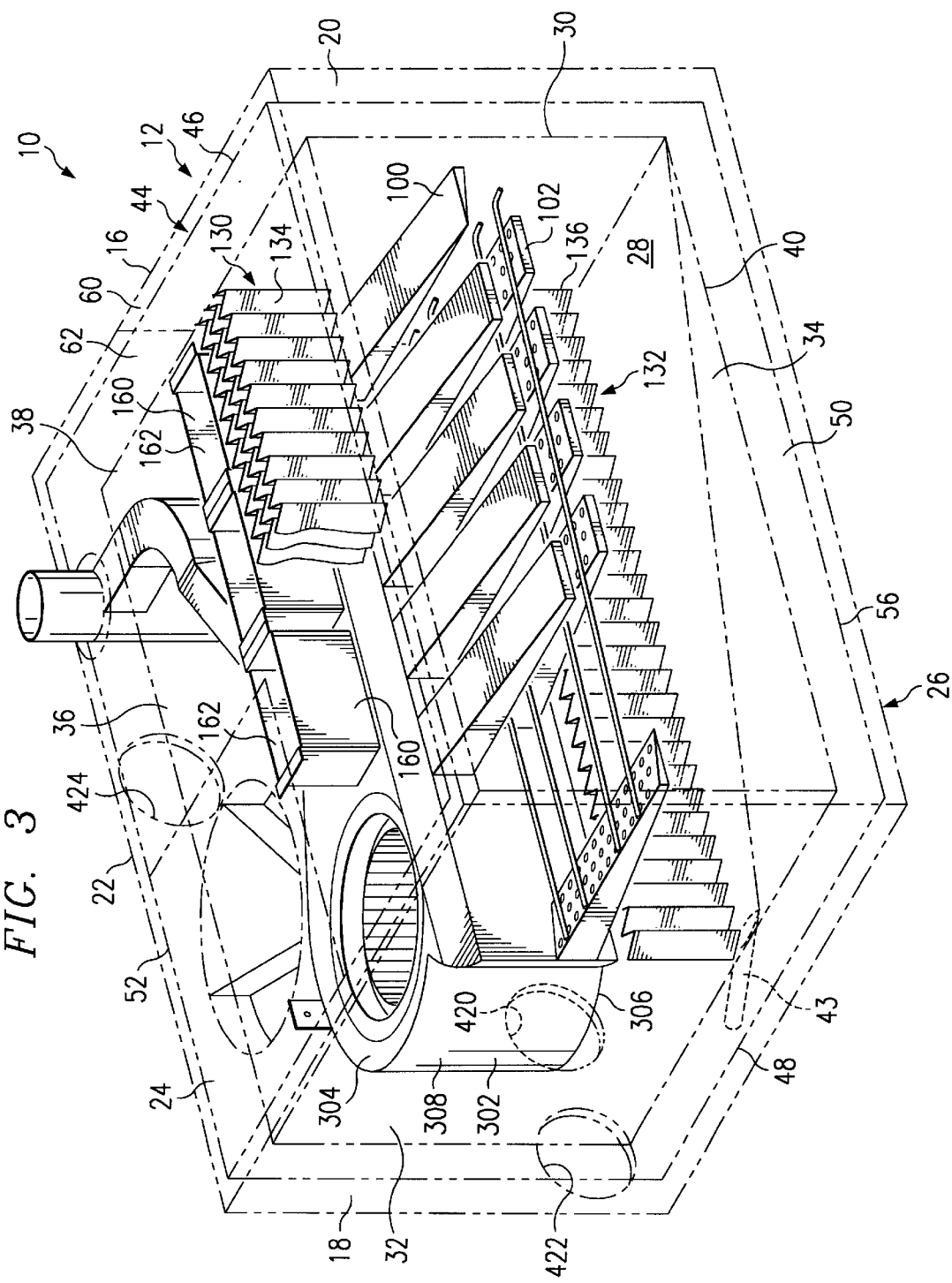
FIG. 3 is a perspective view of the oven of the present invention partially depicting components thereof.
Figure 4:
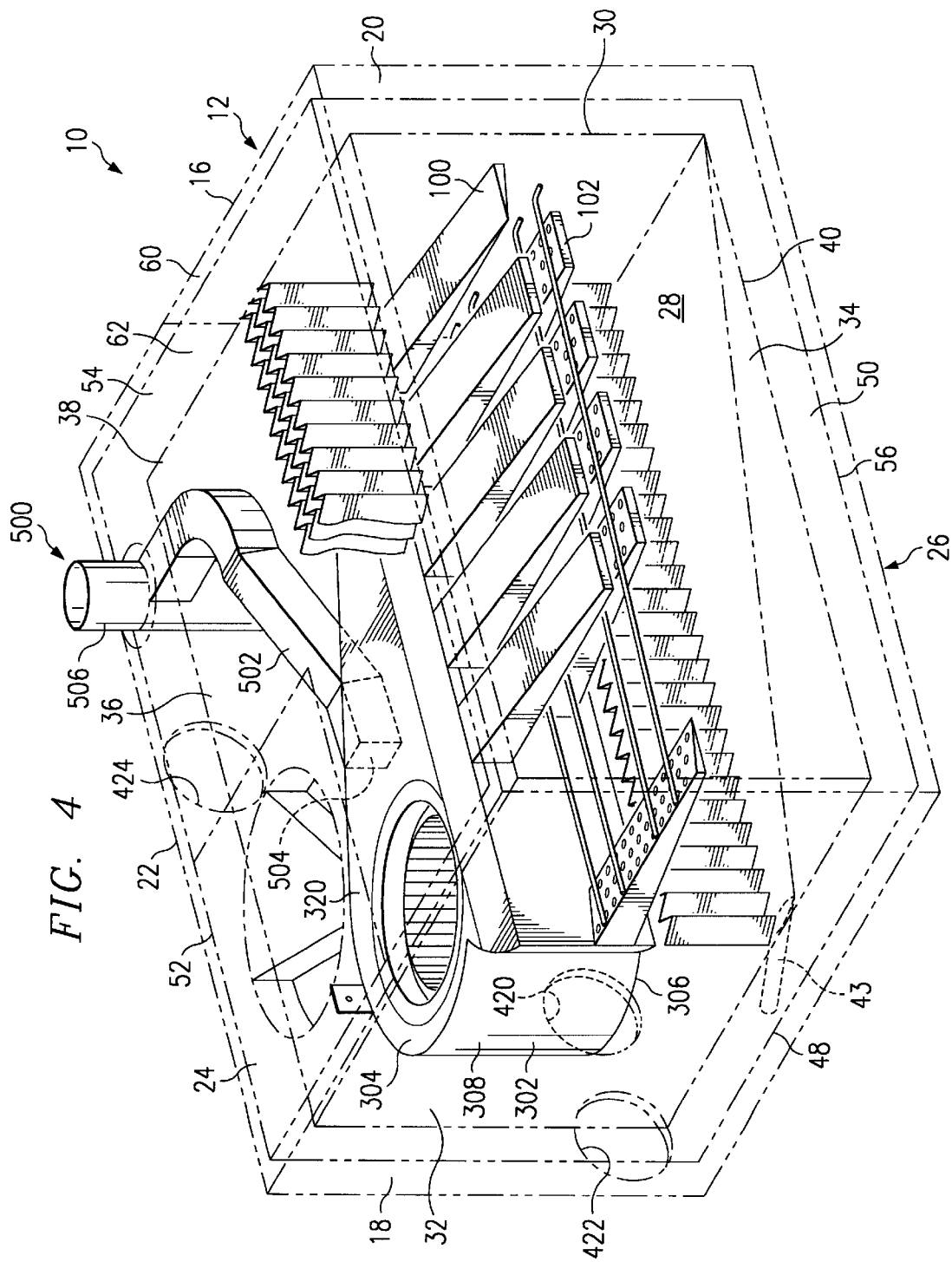
FIG. 4 is a perspective view of the oven of the present invention partially depicting components thereof.
Figure 5:
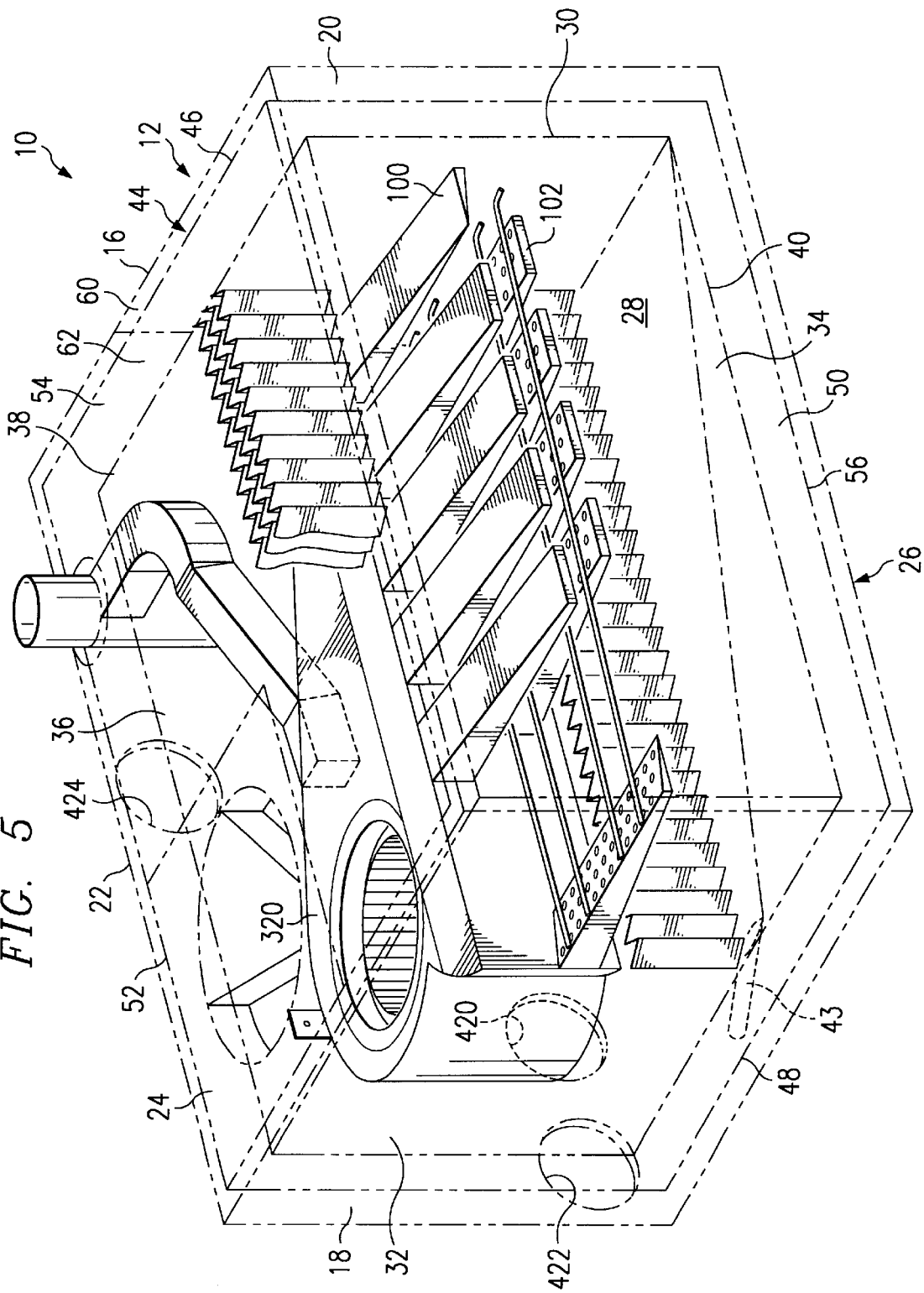
FIG. 5 is a perspective view of the oven of the present invention partially depicting components thereof.
Figure 6:
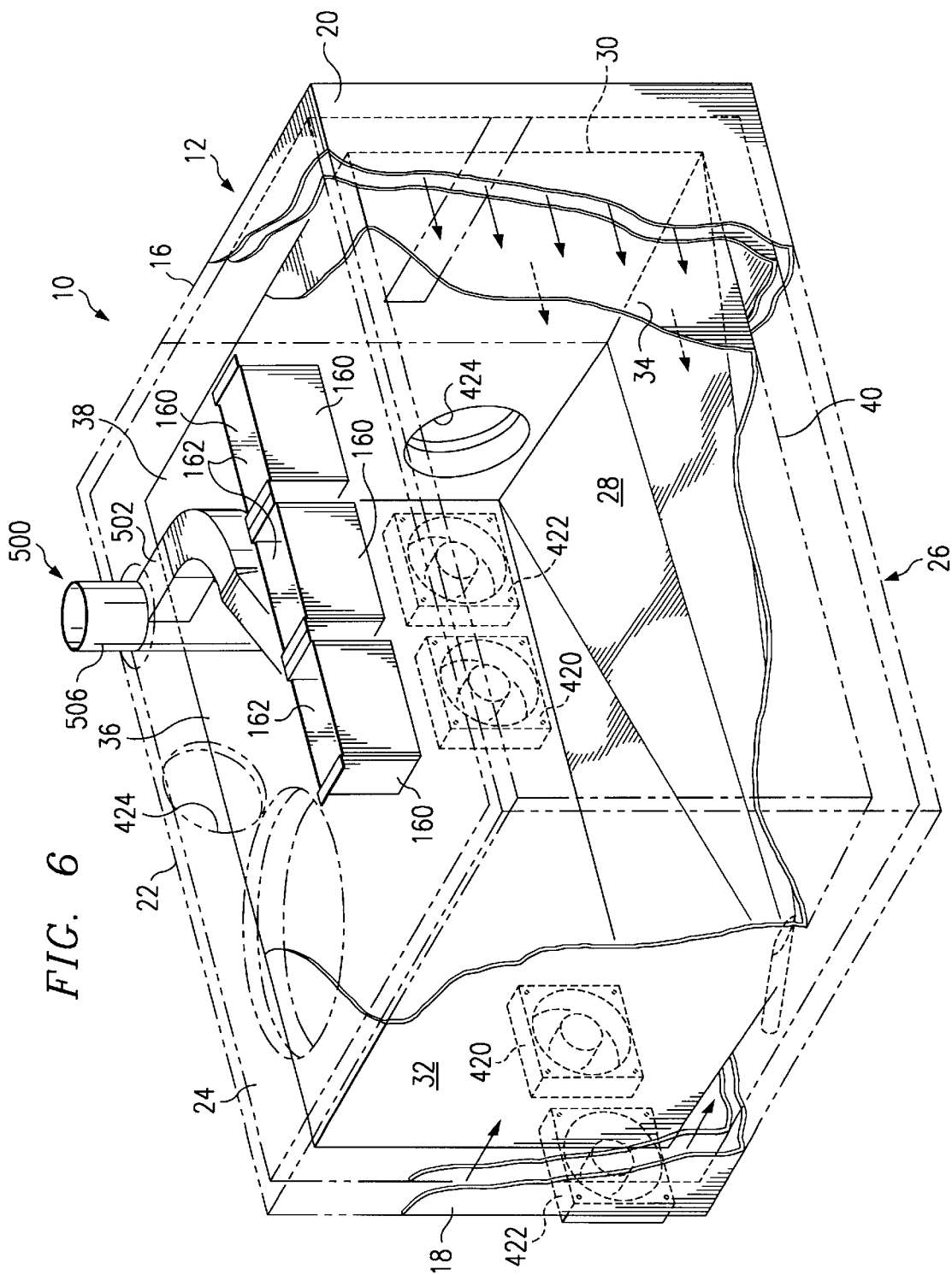
FIG. 6 is a perspective view of the oven of the present invention partially depicting components thereof.

The arrangement of the folded plates with respect to each other may vary. In FIGS. 3 and 27, the plates are spaced from each other a small distance and are in a nested relationship. FIGS. 26 and 30 show the use of two perforated plates in a non-nested configuration, i.e. with peaks 148 of one plate meeting the valleys 150 in the other plate. By providing perforated plates with an accordion fold, air returning from the fingers passes over a greater surface area then would be encountered with a flat plate. This filter assembly design also provides the benefit of slowing the air flow toward the plenum at normal operating conditions from about 2000 ft/min to 300–500 ft/min. At this lower speed, air-entrained particles of grease (and other materials) from the food product cannot maneuver the tortuous path created by the filter design and thus the filter assembly acts as a barrier between the cooking chamber and the return air chamber behind the filter assembly. While the plates in the preferred embodiment of this invention are accordion folded, the plates may be shaped in other (not flat) ways increase the surface area over which return air travels, such as providing repeating 90° bends in the plates or a sine curve pattern.

Mounted within the interior of the oven behind the accordion filters are catalytic converter boxes 160 (FIGS. 1–3, 6, 9, and 10). Catalytic converter boxes 160 hold catalytically coated materials 162, i.e., catalytic converters. Preferably, the catalytic material is a catalytically coated ceramic material. A most preferred catalytic converter material is a palladium-based ceramic catalytic converter available from Applied Ceramics. As the heated air passes the catalytic converter materials 162, smoke and vapor (i.e., volatile organic compounds) in the circulating airstream are more completely oxidized to $CO^2$ and $H^2O$ to prevent smoke from being recirculated into the cooking chamber.

In an alternative arrangement (FIG. 35), the filter assembly 130 may comprise a louver configuration, rather than a folded plate configuration. The louvers 180 can be made of any suitable materials such as stainless steel. The louvers shown are constructed of elongated, hollow stainless steel members and are welded in place. As shown in FIG. 35, the louvers are disposed in the air return path (represented by arrows) and separate the interior chamber 28 into a cooking chamber 28a and air return chamber 28b. After the temperature controlled gas hits a food product the gas returns through the louvers 180, contacting the louvers and allowing entrained particles or grease to be collected on the louvers. As shown, the louvers incline downwardly toward the cooking chamber side 28a of the oven, preventing collected grease and particles from running into the air return chamber 28b. Also, as shown, the air return path is on the top only. In this arrangement, gravity forces assist the system in keeping grease and other entrained food particles from the air return chamber of the oven.

As shown in the figures, most particularly FIGS. 8–9, 15–16, and 22–23, a blower/plenum assembly 300 is mounted within the air return portion 28b of interior chamber 28. Blower/plenum assembly 300 includes a housing 302 comprising top wall 304, bottom wall 306 and having a curved end wall portion 308 shaped for housing a blower wheel 330. Extending from the curved end wall 308 adjacent ducts 100, 102 is front wall 310 disposed substantially perpendicular to the longitudinal axes of the ducts. Extending from the opposite end of the curved wall 308 (adjacent the rear portion of the oven) is rear wall 312 which tapers toward and is secured to front wall 310 adjacent the entrance opening of the oven. Top wall 304 and bottom wall 306 are secured to front wall 310, rear wall 312 and curved end wall 308 by welding or other suitable means such as pop riveting. A plenum 320 is formed by front wall 310, rear wall 312, top wall 304 and bottom wall 306. Outlet openings 322 are formed in front wall 310. Optionally, plenum 320 may also include a diverter or splitter 324 (FIG. 30) for more efficient direction of air toward the outlet openings of the plenum and into the ducts 100 and 102. The walls of the housing and plenum are preferably made of stainless steel.

Figure 15:
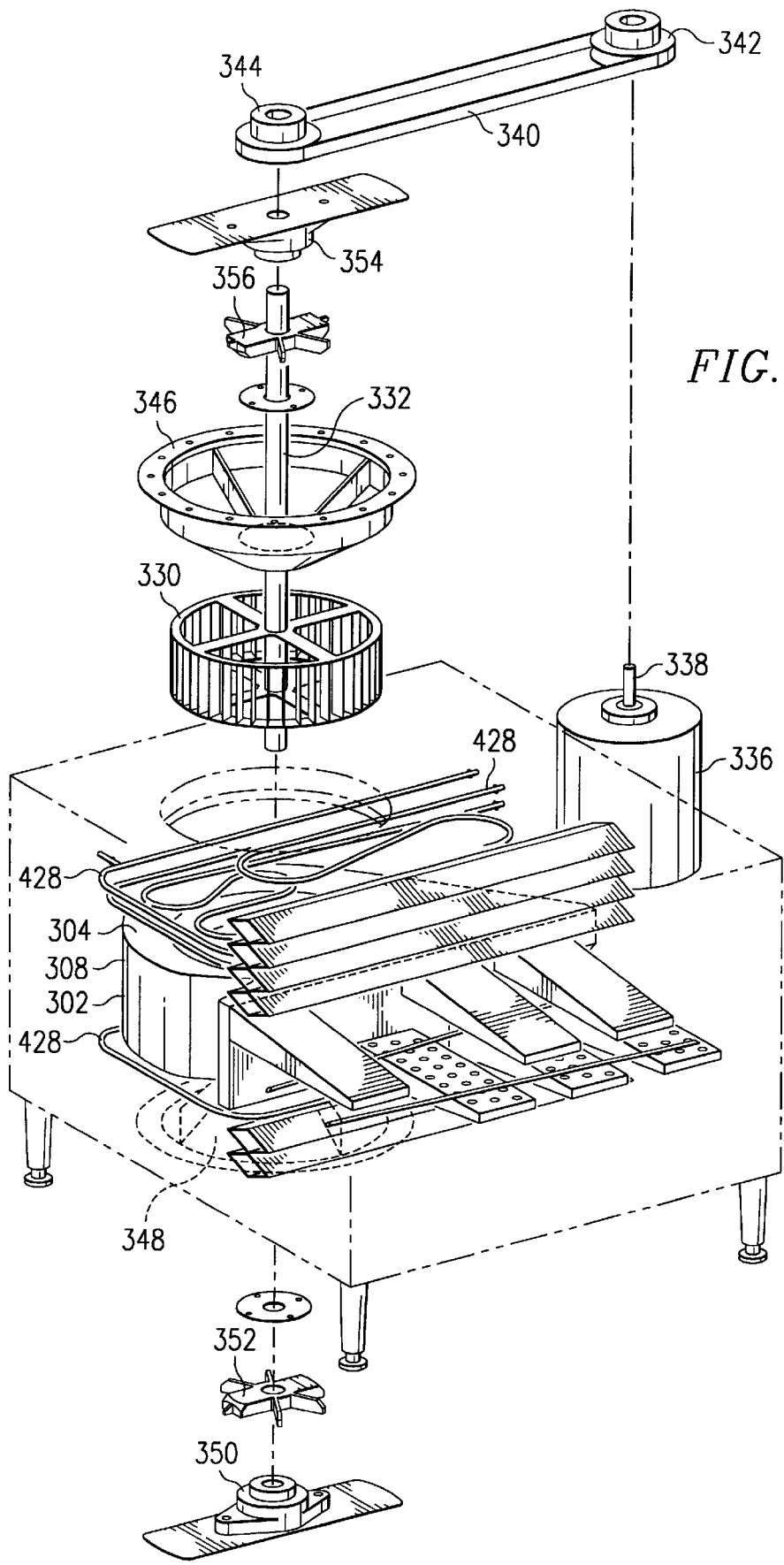
FIG. 15 is a perspective view of the oven of the present invention depicting components of the blower assembly thereof.

Blower wheel 330 is mounted on driven shaft 332 within housing 302 adjacent the curved end wall 308. Blower wheel 330 draws heated air from the return air chamber 28b and circulates the air into plenum 320. As best illustrated in FIGS. 15 and 16, a variable speed, split face motor 336 has a driven shaft 338 which is connected to driven shaft 332 by suitable means such as a belt 340 and pulleys 342 and 344. The end portions of driven shaft 332 extend from blower/plenum housing 302 and through frustroconical shrouds 346 and 348 where said ends are rotatably mounted to interior top wall 38 and interior bottom wall 40, respectively. Frustroconical shroud 348 is mounted to the bottom wall by welding or other suitable means and houses bearing 350 and heat slinger 352 which are operably connected to the end of shaft 332. Frustroconical shroud 346 is mounted to the top wall by welding or other suitable means and houses bearing 354 and heat slinger 356 which are operably connected to the opposite end of shaft 332. Heat slingers 352 and 356 (FIG. 6) serve to reduce the temperature adjacent the upper and lower portions of the shaft, thereby minimizing bearing failure. The shroud may also house insulating materials, such as mineral wool insulation, to further protect the underlying bearings from the adverse effects of heat.

Preferably, to generate high heat transfer rates desirable for cooking foods that are traditionally deep fat fried, the blower wheel and blower motor should be capable of producing air velocities of about 5000–6000 ft/min from ducts 100 and 102. For larger gas-heated ovens, it has been found that a 1.5 horsepower motor is suitable. Further, because the wheel will be subjected to high temperatures, it is preferred that the wheel have sufficiently high heat resistance, preferably 900° F. or greater. A particularly suitable blower wheel is a Revcor forward-inclined industrial wheel having a 9⅛" diameter and three inch width (912-300 Model). This recommended motor and blower wheel configuration is capable of producing the high velocity from the ducts referred to above and produces very high heat transfer rates of about 20 to 27 BTU/(hr.)(sq. ft.)(° F.), as measured by a heat transfer measurement device of the type disclosed U.S. Pat. No. 5,161,889. Further, with larger gas-heated ovens, two double inlet blower wheels may be used. When using two wheels, left and right blower wheels can be bolted back-to-back on one hub.

For smaller electric-heated ovens, a smaller split face motor is suitable for driving the blower. For example, a three-fourths horsepower split-face motor having a ⅓ horsepower idle mode is suitable. The ⅓ horsepower phase produces lower noise and provides sufficient airflow in the cleaning mode of the oven.

Figure 17:
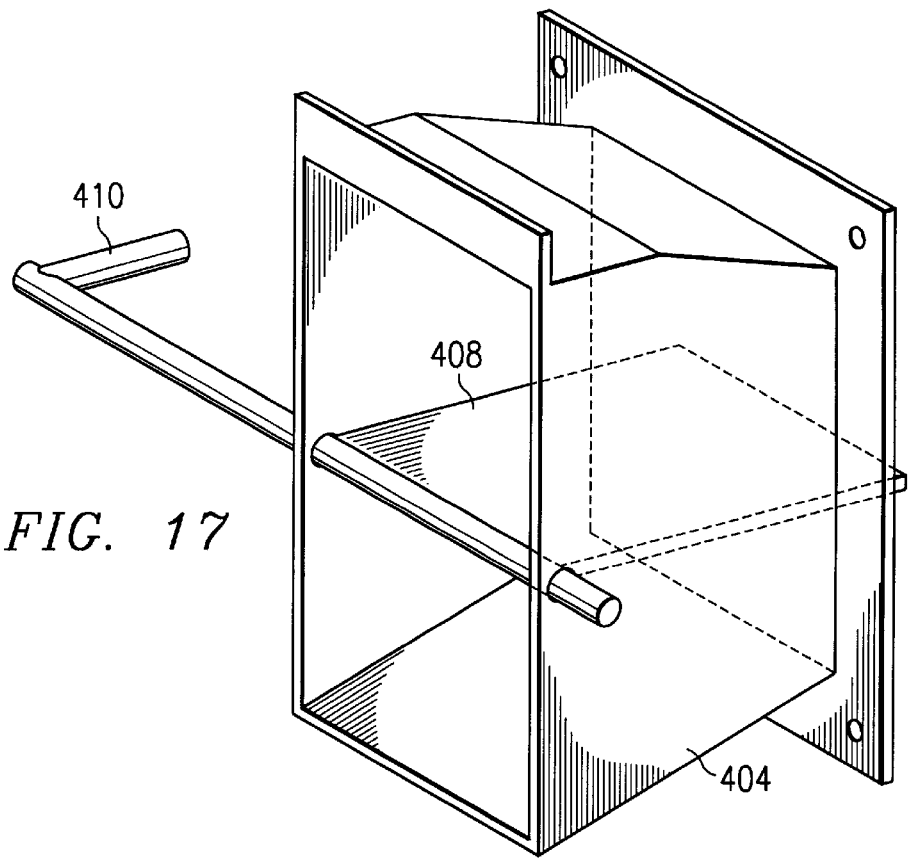
FIG. 17 is a perspective view of the diverter assembly of the present invention.

Referring to FIGS. 30 and 17, the wall cooling features (i.e., "cool skin") of the present oven shall now be described. As shown in FIG. 30, there is provided a cooling blower assembly 400 operably secured to oven cabinet 12. Blower assembly 400 includes blower 402 and conduit 404 mounted to the blower. Conduit 404 is secured to cabinet 12 and is in fluid communication with outer cavity 60 through outer cavity opening 61 and with intermediate cavity 62 through intermediate cavity opening 406. Rotatably mounted within conduit 404 is diverter vane 408. Diverter vane 408 is controlled by diverter rod 410 which is secured thereto. By moving the diverter vane 408 with the diverter rod 410, air from blower 402 can be directed to the outer cavity 60 (Position C), intermediate cavity 62 (Position A) or both cavities (Position B), as shown in FIG. 30. Blower 402 can be of any type capable of producing sufficient pressure (½ inch of water) for this circulation pattern. A forward inclined metal blower with the aforementioned pressure capabilities has been found to be suitable. The arrangement described above and shown in FIG. 30 has been found to be particularly effective because the blower is displaced from the oven cabinet and is always running whether a cooking or cleaning operation is being performed. Thus the blower is maintained at a sufficiently low temperature. In contrast, in a less preferred embodiment shown in FIGS. 1–10, separate axial fans 420 and 422 are mounted to the oven walls and circulate air through the exterior and intermediate cavities of the oven. However, when the fans serving the intermediate cavity of the oven are turned off during pyrolytic cleaning operations (described infra), the fans are subjected to elevated temperatures and may be damaged. Thus, axial fans 420, 422 and vent 424 are shown only as a less preferred embodiment of the invention and the depiction of these structures should be disregarded in the drawings when implementing the preferred embodiment described above and shown in FIGS. 17 and 30.

Referring to FIG. 30, during normal cooking operation, diverter 408 is in Position B and air is circulated through outer cavity 60 and intermediate cavity 62, thereby cooling both the exterior and interior walls of the oven. The cooling of the interior cooking chamber walls enhances the ability to collect grease and prevent undesired smoke during cooking operations. Grease tends to accumulate and gather on cooler surfaces. With air circulating through the intermediate cavity the interior walls of the oven in the cooking chamber are maintained at about 300° F. while the air temperature in the cooking chamber (and other structure within the cooking chamber) is maintained at the selected cooking temperature which generally ranges from about 350–500° F., most typically about 425° F. This lower cooking chamber wall temperature is also below the smoke point of most oils found in food products. Consequently, the oils and grease collecting on the cooler walls do not produce substantial amounts of smoke. Of course, if a smoke flavor in the food is desired, the diverter can be adjusted so that more air is circulated through the exterior cavity and less through the interior cavity, thereby reducing the cooling effect of the air in the intermediate cavity and raising the temperature of the cooking chamber walls. Smoke will be produced when the interior walls reach the smoke point temperature of the oils produced by the food.

As previously stated, the oven of the present invention can be heated by conventional heating means, such as a flame heated heat exchanger (gas) or an electrical resistance heating element. The oven illustrated in FIGS. 11–21 depicts an electrically heated oven. In this embodiment of the invention, electrical heating elements 428 are disposed in the return air chamber 28b of the oven, thereby heating the air which is drawn into the plenum 320 by the blower wheel 330. Particularly suitable electric heating elements are Calrods (General Electric Co.) which are electrically heated for transferring heat to air flowing across them. A thermostatic sensor 430 (FIG. 31) is located in the plenum and is connected to suitable electrical circuitry for controlling the temperature of the heating elements 428.

Figure 31:
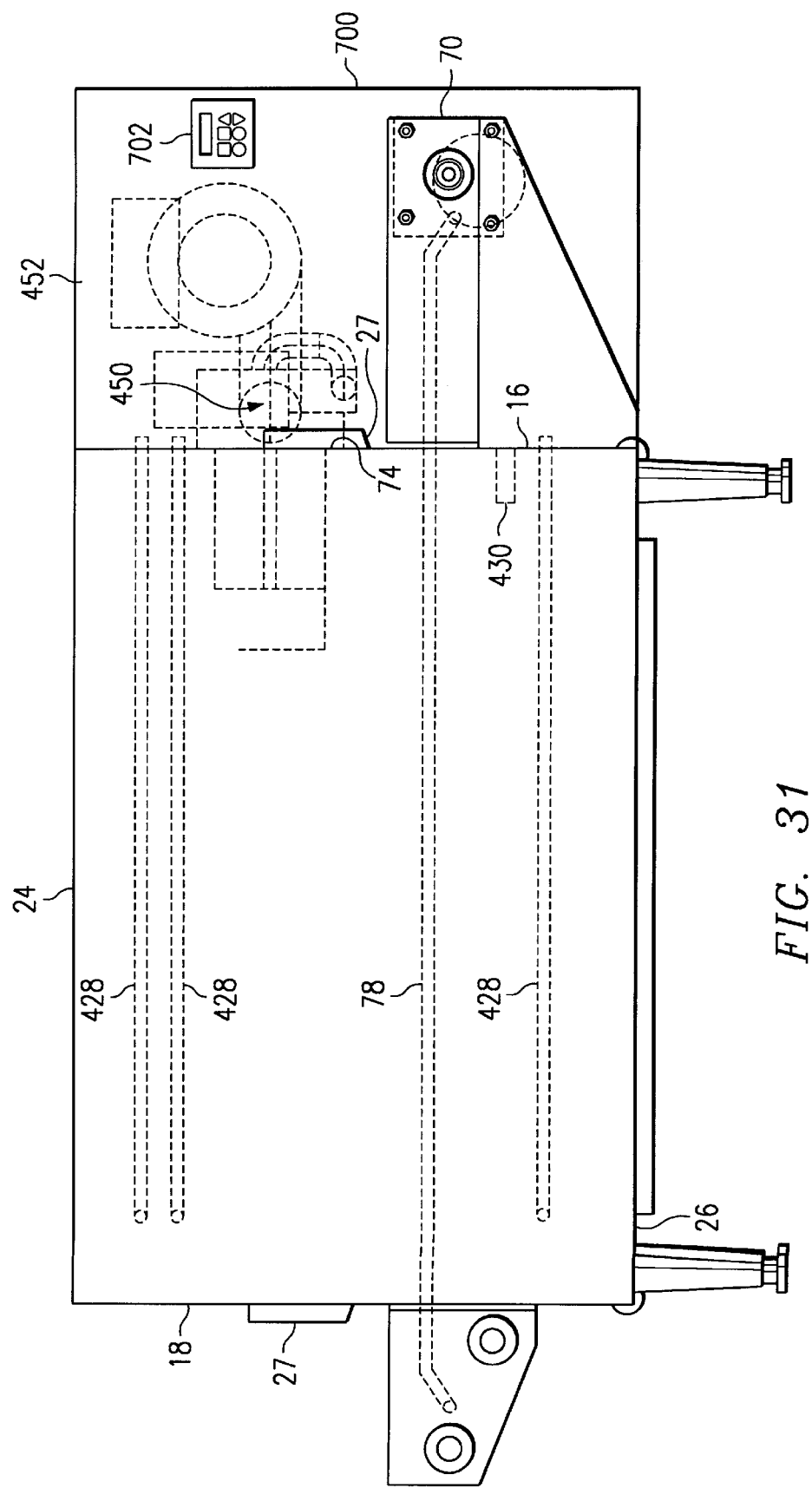
FIG. 31 is a side view of the oven of the present invention partially depicting components thereof.

In the gas heated embodiment of the oven, a conventional configuration implemented in known conveyorized impingement ovens is suitable (see e.g., U.S. Pat. No. 4,462,383, previously incorporated by reference). FIG. 31 shows both electrical and gas heating means options (both are not used together). As shown in FIG. 31, the gas burner 450 is mounted in housing 452 and supplies the flame to heat the return air chamber. Other elements, such as gas piping, a flame shaper and associated orifices, are not shown since they are well known and conventionally associated with gas burners. To regulate the temperature of the gas heat source, conventional control means may be used. Preferably, a burner control is connected to an electric valve which in turn is connected to a gas inlet pipe and modulating control, all well known in the art. The modulating control should be capable of regulating gas flow to the burner head by inputs received from a thermostat sensor 430 (FIG. 31) located in the plenum. Thermostat sensor 430 is able to sense the temperature of the air in the plenum and to provide input to the modulating control. Upon receiving inputs from the thermostatic sensor, the modulating control adjusts the amount of gas supplied to the burner to maintain the selected oven temperature.

Figure 32:
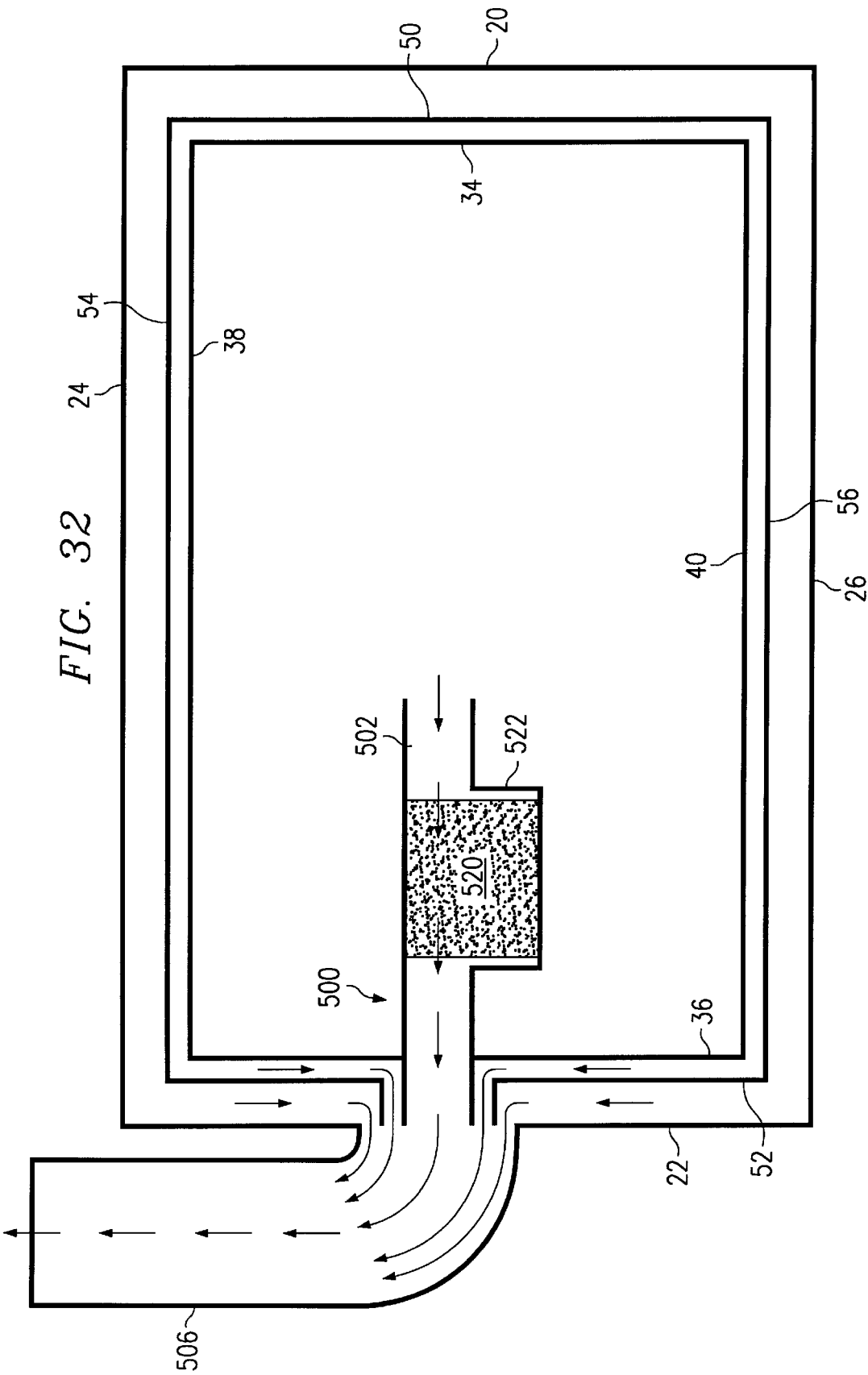
FIG. 32 is a schematic (side view) representation of the air flow through the oven of the present invention.
Figure 33:
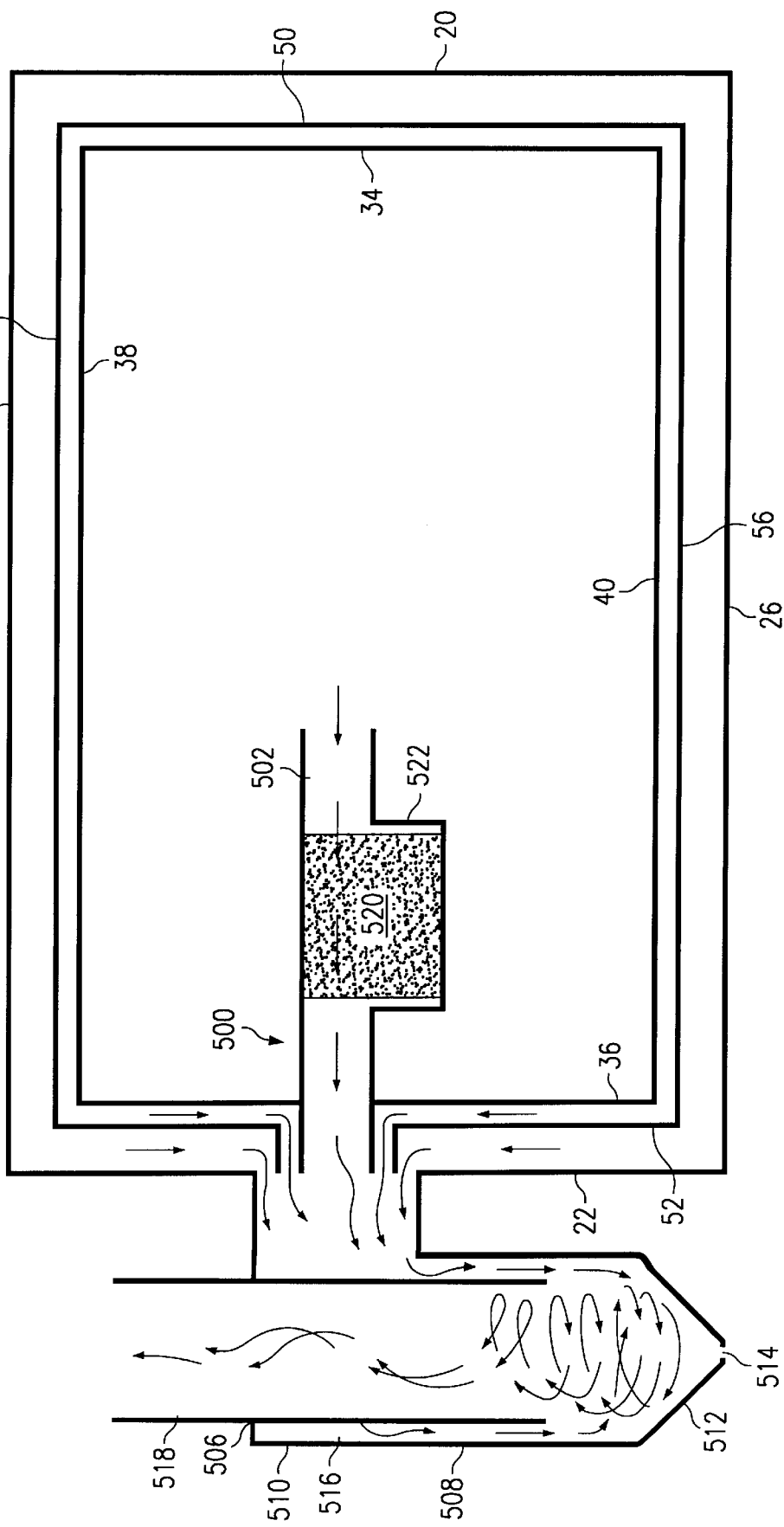
FIG. 33 is a schematic (side view) representation of the air flow through the oven of the present invention depicting a cyclonic separator.

Referring to FIGS. 4, 6, 8, and 32–33 in particular, the exhaust assembly of the ovens shall now be described. Operably connected to plenum 320 is exhaust assembly 500. Exhaust assembly 500 includes a first exhaust conduit 502 attached to and in fluid communication with plenum 320 through opening 504 in the plenum. A portion of the heated air is exhausted through the exhaust conduit 502 during cooking as well as cleaning cycles. From conduit 502 the heated exhaust gasses travel to and through vent pipe assembly 506, which is in fluid communication with conduit 502. Exhaust gasses are then released into the atmosphere through vertical vent pipe assembly 506. Optionally, as shown in FIG. 33, vent pipe assembly 506 may include a cyclonic separator assembly 508. Cyclonic separator assembly includes a vertical (circular) conduit portion 510, a cone section 512, and a plug 514. Exhaust gasses from exhaust conduit 502 enter vertical conduit portion 510 adjacent the inner wall 516 so as to create a cyclonic air flow pattern. This air flow pattern allows heated gasses to escape upwardly through vent pipe 518 while solid particles entrained in the air fall to the cone section 512. Plug 514 is periodically removed to clean out deposits at the bottom of the cone section.

Optionally, the exhaust assembly 500 may also include a catalytic convertor 520 to remove entrained particles from the exhaust gas stream. FIGS. 11–12, 18, and 32–33 show a catalytic convertor 520 disposed in the conduit 502 between plenum 320 and vent pipe assembly 506. The catalytic convertor can be of the same type described heretofore. As shown in these figures, catalytic convertor 520 is disposed within frame 522. Frame 522 is preferably constructed of materials capable of withstanding high temperatures, most preferably above 900° F. to accommodate the high temperatures encountered during self-cleaning cycles. Suitable materials include stainless steel and carbon steel.

In a preferred embodiment of the invention shown in FIGS. 30 and 32–33, the oven is configured so that the cooling air being circulated through outer cavity 60 and intermediate cavity 62 (the "cooling air stream") is mixed and vented with high temperature gases exhausted from the plenum. This configuration is particularly suitable for gas-heated ovens which are required by regulations to exhaust a certain portion of the heated cooking gas stream. By mixing the lower temperature cooling air stream with the exhaust gas stream, the exhaust gas stream temperature is lowered significantly. For example, an exhaust gas stream temperature of 900° F. (cleaning cycle temperature) can be lowered well below regulatory requirements by venting the cooling air stream into the plenum exhaust stream. The above-described configuration is also preferred for electric heated ovens to lower the high temperature exhaust gasses produced by the oven during pyrolytic cleaning operations.

FIGS. 30 and 32–33 show this preferred configuration wherein the cooling stream is mixed with the plenum exhaust stream. As shown, cooling air from intermediate chamber 62, represented by the arrows, circulates through the intermediate chamber 62 and is vented through opening 550 and into vent pipe assembly 506 where it mixes with the exhaust gas stream. Similarly, cooling air from outer cavity 60, represented by the arrows, circulates through the outer cavity 60 and is vented through opening 552 and into vent pipe assembly 506 where it also mixes with the exhaust gas stream.

Having described the various components of the oven above, a discussion of the cooking air flow in the oven will be described below. Referring to FIG. 30, air is heated in return air chamber 28b and is drawn into housing 302 by blower 330. The heated air then travels from blower 330 into plenum 320. Heated air exits plenum 320 through outlet openings 322 and enters ducts 100 and 102 disposed above and below the conveyor. The heated air then exits ducts 100 and 102 through openings 112 and impinges upon food product traveling on the conveyor belt. Air in the cooking chamber next travels through filter assemblies 130, 132. The cycled air is then exposed to catalytic converters 162 disposed in the return air chamber of the oven. The air is heated in the return air chamber 28b as the circulation cycle repeats continuously. While most of the heated cooking air is recycled and recirculated, a small portion of the heated air is vented from the plenum 320 through the exhaust assembly 550 heretofore discussed and described.

Figure 28A:
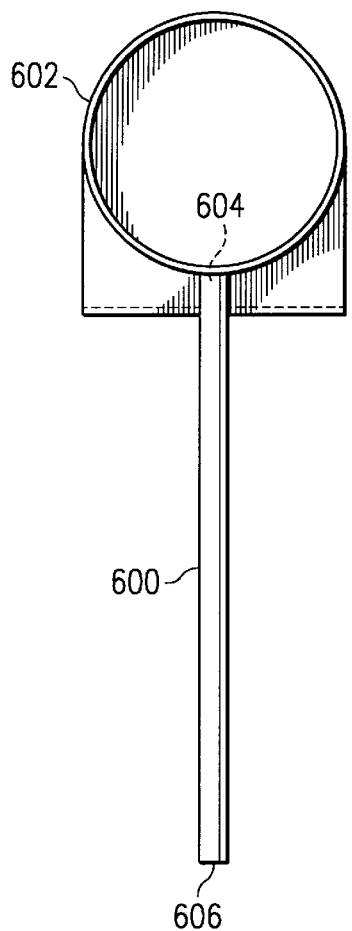
FIG. 28 shows multiple views of the water reservoir assembly of the present invention.
Figure 28B:
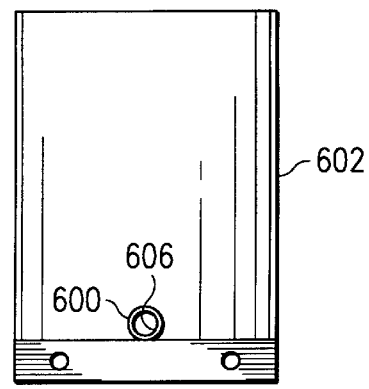
Figure 28C:
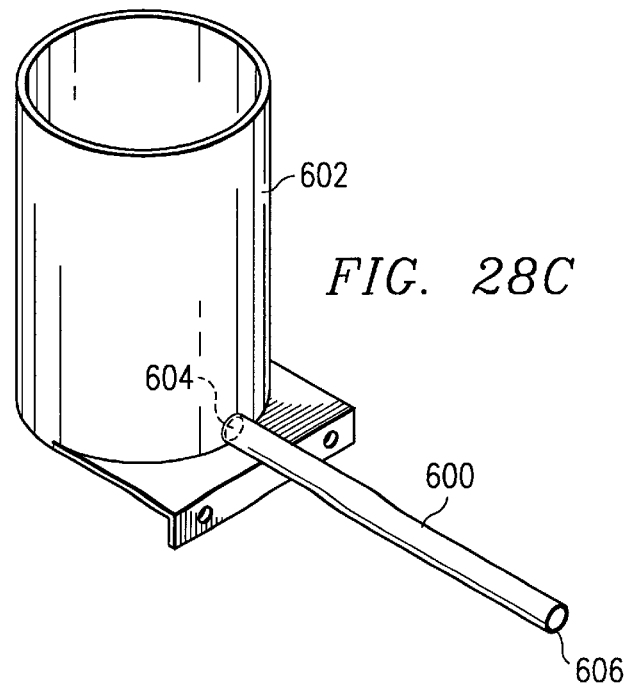
Figure 29A:
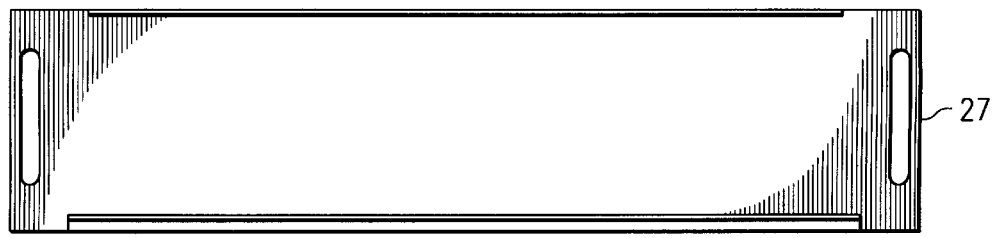
FIG. 29 shows multiple views of the eyelid assembly of the present invention.
Figure 29B:
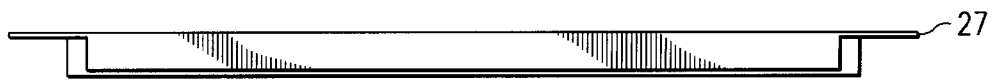
Figure 29C:
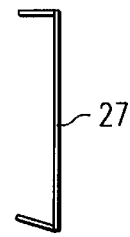
Figure 29D:
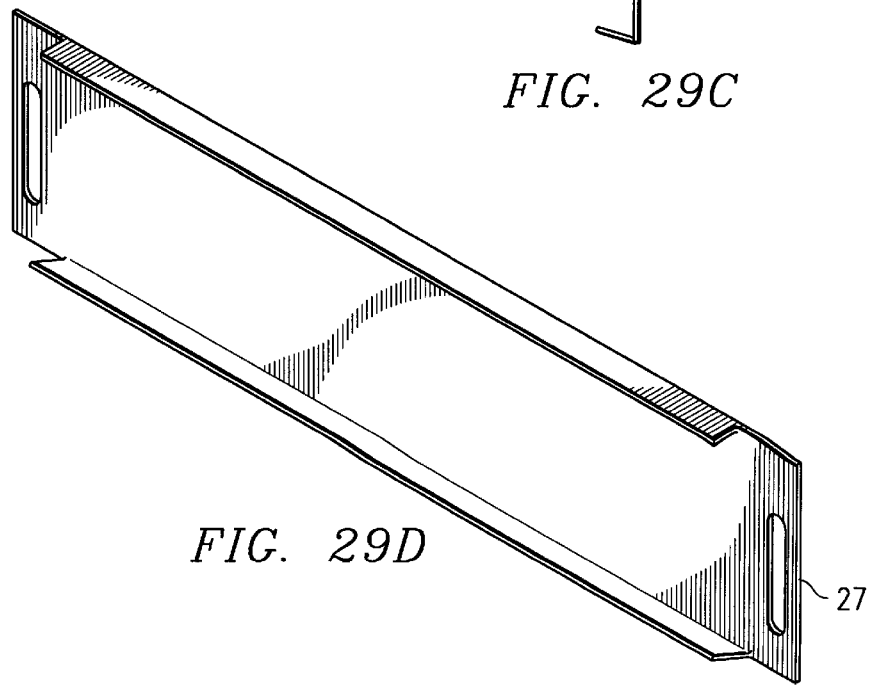

In the preferred embodiment shown in the drawings, the invention includes self-cleaning capabilities using pyrolytic cleaning means. Assuming that the oven has been operating at standard temperatures between 375° F.–425° F. for a 10-hour day, the oven is likely to be at least moderately soiled. During pyrolytic cleaning operations the conveyor is operating so that the soiled conveyor belt and the cooking cavity of the oven are cleaned. A conveyor speed of 6–10 minutes (i.e., pass through time from entry to exit) is adequate. The steps of a preferred cleaning operation are as follows:

To begin cleaning operations, the temperature of the oven is brought to 300° F. When the oven has reached 300° F., eyelids 27 (FIG. 31) are moved over the exit and entrance openings in the oven and the diverter 408 is adjusted so that maximum air is diverted to the outer cavity 60 [Position C] (see FIG. 30). With the diverter in this position, cooling air is cut off to the intermediate cavity 62 thereby minimizing the cooling of interior walls of the cooking chamber and allowing the interior walls of the oven reach higher temperatures. Next, water containing a small amount of detergent is sprayed into the cooking cavity. Preferably, this is accomplished by spraying the water into the blower wheel 330. FIG. 28 shows a structure that can be used for this purpose. Referring to FIG. 28, pipe 600 is attached to reservoir 602 at opening 604. In use, the assembly is mounted to the exterior rear wall of the oven adjacent the blower wheel, with the end 606 of the pipe 600 disposed through the walls of the oven. Water is simply poured in the reservoir 602 and flows into the interior of the oven adjacent the blower wheel. When the water/detergent mixture contacts the metal structures in the oven, including the jet fingers, conveyor belt, and interior cooking cavity walls, steam is created which softens and dissolves the grease and other food deposits on the walls and other metal structures in the oven. The softened and dissolved greases and deposits then run to the inclined floor of the oven, into the drain 42 and out of the oven through pipe 43. This step may be repeated if necessary.

A moderately to highly soiled oven will typically require 2–3 cycles of water/detergent mixture. After the water/detergent cycle, a rinse cycle is initiated by spraying water into the cooking cavity of the oven. It has been found that two water rinse cycles are preferable. The water will cool the oven interior substantially. When the temperature again reaches 300° F., after the water rinse cycle or cycles, the rinse cycle is complete.

Next, the temperature of the oven is brought up to 600° F. and remains at that temperature for approximately one hour or until the oven stops producing smoke. Then the temperature is increased to 700° F. for approximately one hour, or again, until the oven stops producing smoke. After the above step, the temperature in the interior of the oven is increased to 900° F. and remains at that temperature for approximately one hour. Next, the temperature in the oven is reduced to 300° F. and the diverter 408 is adjusted so that cooling air is circulated into both the intermediate and outer cavities thereby permitting the interior walls of the cooking cavity to cool. When the temperature in the interior of the oven reaches 300° F., two water rinse cycles, as described above, are performed.

When the pyrolytic cleaning operations are completed, some amounts of white ashy material may remain on the conveyor belt. These ashy deposits can be simply removed by wiping the conveyor belt with a wet rag as the belt moves. As stated above, a satisfactory belt speed for the cleaning operation would be a rate of 6–10 minutes for a point on the belt to pass through the cooking cavity.

After the final rinse cycles in the self-cleaning operation, the oven can be brought up to standard cook temperature, e.g. 425° F., to prepare the oven for cooking. Preferably, the conveyor belt is conditioned for the next cooking operation by simply wiping down the moving conveyor with an oily rag while the oven is at cook temperature. This seasons the belt and keeps product from sticking to the conveyor belt.

Figure 34:
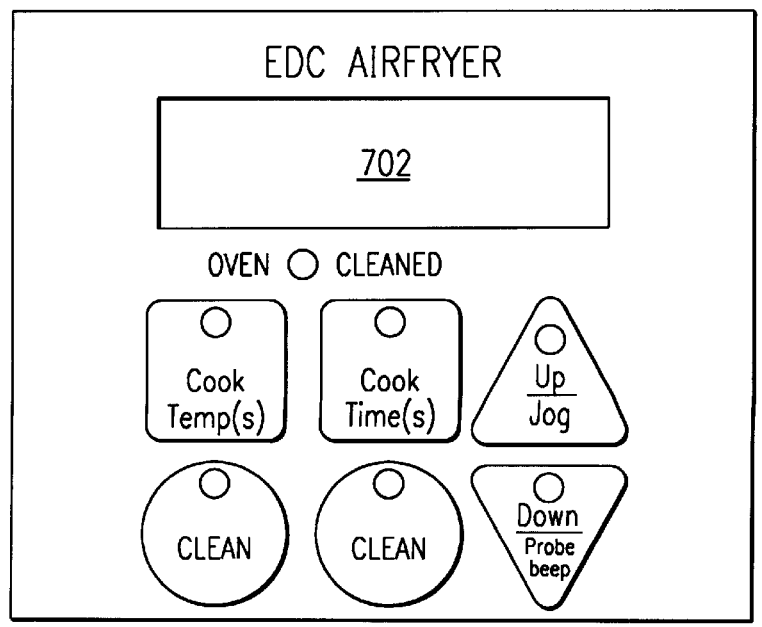
FIG. 34 is a graphic representation of electronic controls for the oven of the present invention.
Figure 18A:
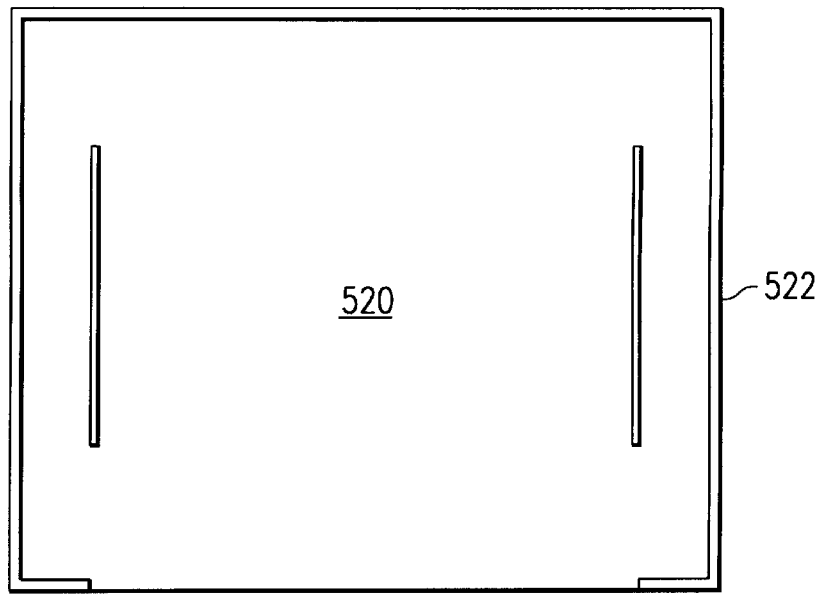
FIG. 18 shows multiple views of the catalytic converter holder of the present invention.
Figure 18B:
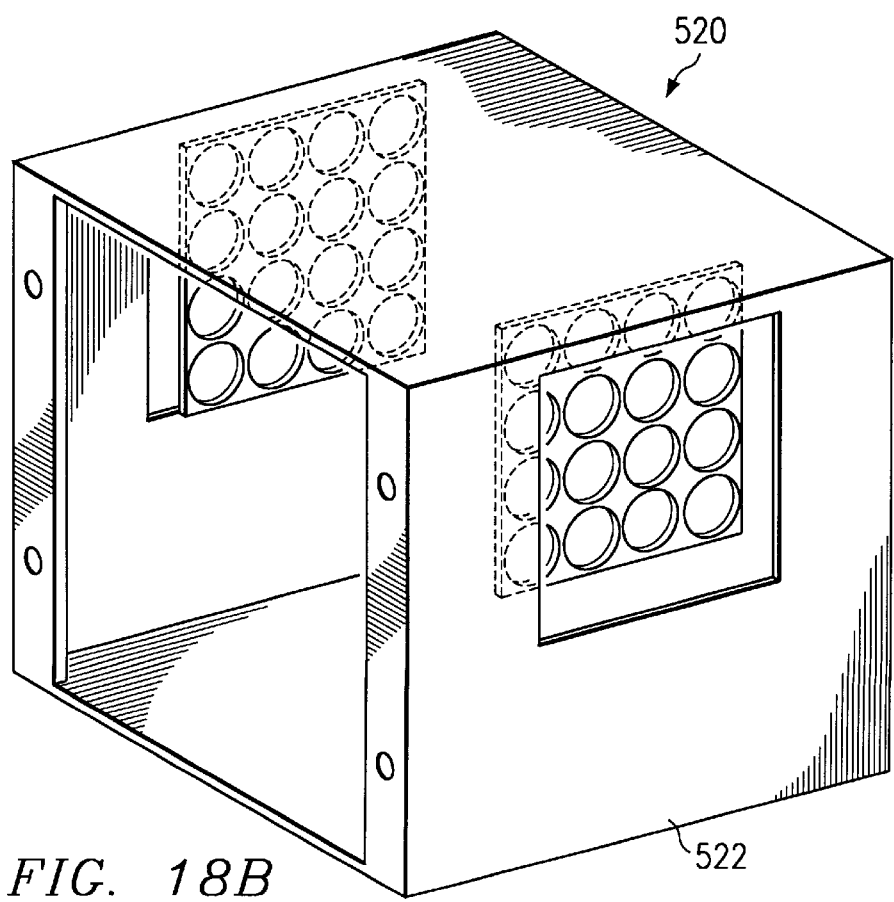

Preferably, cooking temperatures, cooking times, and the cleaning operation of the oven are controlled with an electronic programmable controller. Programmable controllers suitable for these purposes are well known in the industry. For example, U.S. Pat. No. 4,462,383 (hereby incorporated by reference) describes a suitable controller for ovens of the type described herein. Referring to FIGS. 31 and 34, the controller components can be housed in control center housing 700 which is secured to the oven cabinet by welding, riveting or other suitable means. Cook time is dependent upon the conveyor belt travel time through the oven. Temperatures and times can be increased or decreased with up and down touch pad controls as shown in FIG. 34. A digital display 702 indicates oven temperature and counts down time remaining for the cycle being run.

To cook food in the above-described oven, the oven temperature and cook time are selected for the particular food product. Suitable cooking temperature typically range from 350–450° F. A cook temperature found to be suitable for many food products is 425° F. After the oven reaches the desired cook temperature, food product may be placed directly on the moving conveyor belt and passes through the cooking chamber. Table 1 shows cook temperatures and cook times for various food products and compares the performance of the above-described oven (designated Air Fry™) with conventional ovens and fryers.

TABLE 1

| | Air Fry ™ 425° F. | Normal Cook | Deep Fat Fry 350° F. |
|---|---|---|---|
| AIR FRY ™ OVEN - Traditional Fried Products | | | |
| Mrs Friday's Fish | 6:00 | 20:00 - 375° F. | 6:00 |
| McCarty's Chicken Tenders | 5:30 | 14:00 - 400° F. | 5:30 |
| Anchor Poppers ™ | 4:30 | 11:00 - 450° F. | 4:00 |
| Ore Ida Mushrooms | 4:30 | 7:00 - 475° F. | 3:00 |
| Ore Ida Hash Browns | 4:00 | 15:00 - 350° F. | 3:30 |
| Ore Ida Premier Fries | 3:30 | | 2:30 |
| Lamb Weston Stealth Fries | 3:30 | | 3:00 |
| Ore Ida Spicy Fries | 3:30 | 11:00 - 450° F. | 3:00 |
| Ore Ida Zucchini Slices | 3:30 | 7:00 - 450° F. | 3:00 |
| Ore Ida Onion Rings | 2:30 | 5:30 - 425° F. | 2:30 |
| AIR FRY ™ OVEN - Items not traditionally fried in deep fat fryer | | | |
| Shrimp | 2:00 | 4:00 - Grill | |
| Hot dog | 3:30 | 5:00 - Grill | |
| Scallops | 3:15 | 6:00 - Sauté | |
| Steak | 3:30 (belt) | 10:00 - Grill | |
| Chicken breast | 5:30 | 10:00 - Grill | |
| Gourmet burger | 6:45 | 7:00 - Grill | |
| | 500° F. | | |
| Burgers | 4:20 (belt) | 5:00 - Grill | |
| Sausage Patties | 4:20 (belt) | 5:00 - Grill | |

TABLE 1-continued

| | Air Fry ™ 425° F. | Normal Cook | Deep Fat Fry 350° F. |
|---|---|---|---|
| LINCOLN IMPINGER ® II | | | |
| | 500° F. | | |
| Burgers | 6:30 (belt) | | |
| Sausage patties | 6:30 (belt) | | |

As demonstrated by Table 1, the oven described herein significantly reduces cook times for various food products. At the same time, the oven also allows traditionally deep fat fried foods to be cooked with air rather than oil, thus providing a significant health benefit. Using air rather than oil also eliminates the various inherent dangers of hot oil used in deep fat frying. The present oven also represents a significant improvement over known conveyorized impingement ovens. Specifically, the present oven is capable of delivering heat transfer rates sufficiently high to suitably cook foods which are traditionally deep fat fried. Furthermore, conventional conveyorized ovens do not adequately address the problem of grease capture and smoke elimination. Thus, food cooked in conventional conveyorized ovens are typically placed in cooking pans or other containment means.

It should be noted that the terms "upper" and "lower," "front" and "rear," "top" and "bottom," and "above" and "below" have been used to facilitate the description of the illustrated embodiments of the invention and that these terms are not intended to limit the scope of the invention. Further, the terms "opening," "opening," "orifice," and "orifices" are intended to include circular and non-circular openings, apertures or holes configured to form and produce a stream of fluid. "Heating" is intended to mean the transfer of heat to or from a product and includes cooling and "heated air" is intended to mean heated gasses and heated air.

Although the present invention has been described with respect to preferred embodiments, various changes, substitutions and modifications of this invention may be suggested to one skilled in the art, and it is intended that the present invention encompass such changes, substitutions and modifications as fall within the scope of the appended claims.

What is claimed is:

1. An oven comprising:
   exterior walls defining an exterior cabinet of said oven;
   interior walls defining an interior chamber of said oven;
   intermediate walls disposed between said exterior walls and said interior walls, said intermediate walls and said interior walls defining an intermediate cavity between said interior and intermediate walls and said interior walls and said exterior walls defining an outer cavity between said exterior and intermediate walls;
   a product support disposed in said interior chamber;
   a first blower for circulating temperature controlled gas into said interior chamber, said first blower being in fluid communication with at least one duct, said duct having a jet plate with a plurality of orifices positioned to direct said temperature controlled gas toward said product support within the interior chamber of said oven; and
   at least one other blower in fluid communication with said outer cavity and with said intermediate cavity capable of circulating air through said outer cavity and circulating air through said intermediate cavity for controlling the temperature of said interior walls and said exterior walls.

2. The oven of claim 1 wherein said at least one other blower circulates ambient air.

3. The oven of claim 1 wherein there are separate blowers to circulate air through said outer cavity and through said intermediate cavity.

4. The oven of claim 1 wherein said at least one other blower comprises a single blower, said oven further including a diverter associated with said outer cavity and said intermediate cavity, said diverter being adjustable to control the amount of said air circulated through said outer cavity and through said intermediate cavity.

5. The oven of claim 4 wherein said diverter is adjustable to substantially eliminate said air circulation through said intermediate cavity.

6. The oven of claim 1 further including an exhaust conduit for exhausting at least a portion of said temperature controlled gas from the oven.

7. The oven of claim 6 further including a conduit whereby a portion of said air circulated through said outer cavity and/or through said intermediate cavity is mixed with said exhausted portion of temperature controlled gas.

8. The oven of claim 6 further comprising a catalytic converter positioned to treat said exhausted portion of temperature controlled gas.

9. The oven of claim 6 further comprising a cyclonic separator positioned downstream of said exhaust conduit.

10. The oven of claim 1 where said interior walls include an inclined floor, said inclined floor being sloped toward a drain pipe leading out of said oven.

11. The oven of claim 1 further comprising a conduit for providing water into said interior chamber of said oven.

12. The oven of claim 1 wherein said product support comprises a conveyor.

13. The oven of claim 1 where said at least one duct comprises a plurality of ducts.

14. The oven of claim 13 wherein there is at least one duct above said product support and at least one duct below said product support.

15. The oven of claim 14 wherein there is a plurality of ducts above and a plurality of ducts below said product support.

16. A method of heating a food product with the oven of claim 1 comprising:
   providing a food product on said product support;
   circulating heated gas having a temperature into said interior chamber through said at least one duct; and
   controlling the temperature of the interior walls of said oven by circulating air through said intermediate cavity.

17. The method of claim 16 further comprising the step of circulating air through said outer cavity to control the temperature of said exterior walls of said oven.

18. The method of claim 16 wherein air is circulated through said intermediate cavity to produce an interior wall temperature that will not produce smoke upon contact with food particles.

19. The method of claim 16 wherein air circulated through said intermediate cavity is reduced to produce an interior wall temperature that will produce smoke upon contact with food particles.

20. A method of cleaning the oven of claim 1 comprising:
   circulating air through said outer cavity of said oven;
   restricting air circulation through said intermediate cavity of said oven to allow said interior walls to reach elevated temperatures;
   bringing the temperature of the interior chamber of said oven to at least 300° F.;
   increasing the temperature of the interior chamber of the oven to at least about 600° F. allowing smoke to be produced and maintaining this temperature until smoke production is substantially ceased;
   increasing the temperature of the interior chamber of said oven by about 100° F. allowing smoke to be produced and maintaining this temperature until smoke production is substantially ceased; and
   increasing the temperature of the interior chamber of said oven by about 200° F. and maintaining this temperature until smoke production is substantially ceased.

21. A method of cleaning the oven of claim 1 comprising:
   circulating air through said outer cavity of said oven;
   restricting air circulation through said intermediate cavity of said oven to allow said interior walls to reach elevated temperatures; and
   providing a temperature in the interior chamber of said oven sufficient to pyrolitically clean said interior chamber.

22. A method of cleaning the oven of claim 12 comprising:
   circulating air through said outer cavity of said oven;
   restricting air circulation through said intermediate cavity of said oven to allow said interior walls to reach elevated temperatures;
   providing an elevated temperature in the interior chamber of said oven sufficient to pyrolitically clean said interior chamber; and
   moving said conveyor through said interior chamber while said chamber is at said elevated temperature.

23. The oven of claim 1 wherein said at least one duct has a proximal end and a distal end and a length extending between said proximal end to said distal end; and said duct has an inlet opening adjacent said proximal end through which said gas enters; said duct comprising a jet plate having a plurality of orifices along said length through which gas may exit said duct, said duct further comprising a first tapered portion adjacent said proximal end and a second tapered portion adjacent said distal end, said first tapered portion having a greater angle of taper than said second tapered portion.

24. The oven of claim 23 wherein said at least one duct comprises a plurality of ducts.

25. The oven of claim 24 wherein said plurality of ducts comprises at least one duct above and at least one duct below said product support.

26. The oven of claim 24 wherein said plurality of ducts comprises a plurality of ducts above said product support and a plurality of ducts below said product support.

27. The oven of claim 1 further comprising:
   at least one filter plate disposed within said interior chamber separating said interior chamber into a cooking chamber and an air return chamber, said plate having perforations formed therein and having a plurality of bends.

28. The oven of claim 27 wherein said plurality of bends comprises accordion folds.

29. The oven of claim 27 wherein said at least one filter plate comprises a plurality of filter plates each having perforations and an accordion fold shape, said filter plates being disposed in a nested configuration.

30. The oven of claim 28 wherein said filter plate has a first side and a second side, said perforations in said filter plate comprising rows of punch-out sections extending from said first side and from said second side.

31. The oven of claim 1 wherein said interior chamber comprises a cooking chamber and an air return chamber, said oven having a return path for said temperature controlled gas whereby at least a portion of said gas is returned to said blower after entering said cooking chamber and said oven having at least one catalytic converter disposed in said gas return path.

32. The oven of claim 31 wherein said at least one catalytic converter comprises a plurality of catalytic converters.

33. The invention of claim 31 further comprising at least one perforated filter plate disposed within said interior chamber separating said interior chamber into said cooking chamber and said air return chamber.

34. The invention of claim 33 wherein said at least one perforated filter plate has an accordian fold shape.

35. The invention of claim 1 further comprising a plurality of louvers disposed in said interior chamber separating said interior chamber into a cooking chamber and an air return chamber, said louvers being downwardly inclined toward said cooking chamber, said louvers being positioned such that said temperature controlled gas passes through said louvers before returning to said blower for recirculation into said at least one duct.

36. The invention of claim 31 further comprising a plurality of louvers disposed in said interior chamber separating said interior chamber into a cooking chamber and an air return chamber, said louvers being downwardly inclined toward said cooking chamber, said louvers being positioned such that said temperature controlled gas passes through said louvers before returning to said blower for recirculation into said at least one duct.

* * * * *